(12) United States Patent
Smith et al.

(10) Patent No.: US 11,122,389 B2
(45) Date of Patent: Sep. 14, 2021

(54) SYSTEM AND METHOD OF CALIBRATION FOR ESTABLISHING REAL-TIME LOCATION

(71) Applicants: DENSO International America, Inc., Southfield, MI (US); DENSO CORPORATION, Kariya (JP)

(72) Inventors: Eric J. Smith, Holland, MI (US); R. Michael Stitt, Ada, MI (US); Karl Jager, Zeeland, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 0 days.

(21) Appl. No.: 16/713,363

(22) Filed: Dec. 13, 2019

(65) Prior Publication Data

US 2020/0196095 A1  Jun. 18, 2020

Related U.S. Application Data

(60) Provisional application No. 62/779,740, filed on Dec. 14, 2018.

(51) Int. Cl.
| | | |
|---|---|---|
| *H04W 4/80* | (2018.01) | |
| *H04W 4/02* | (2018.01) | |
| *H04W 76/15* | (2018.01) | |
| *H04B 17/318* | (2015.01) | |
| *H04W 4/029* | (2018.01) | |

(Continued)

(52) U.S. Cl.
CPC ............ *H04W 4/023* (2013.01); *H04B 17/11* (2015.01); *H04B 17/318* (2015.01); *H04W 4/029* (2018.02); *H04W 4/40* (2018.02); *H04W 76/15* (2018.02); *H04W 4/80* (2018.02); *H04W 84/12* (2013.01)

(58) Field of Classification Search
CPC ..... H04W 4/023; H04W 84/12; H04W 76/15; H04W 4/029; H04W 4/40; H04W 4/80; H04B 17/11
USPC ........................................................ 455/456.1
See application file for complete search history.

(56) References Cited

U.S. PATENT DOCUMENTS

| | | |
|---|---|---|
| 2005/0130677 A1 | 6/2005 | Meunier et al. |
| 2005/0192056 A1 | 9/2005 | Karaki |

(Continued)

FOREIGN PATENT DOCUMENTS

| | | |
|---|---|---|
| JP | 2008-281522 | 11/2008 |
| JP | 2013-031045 | 2/2013 |

OTHER PUBLICATIONS

International Search Report and the Written Opinion of the International Searching Authority for international application No. PCT/US2019/066254 dated Apr. 7, 2020.

*Primary Examiner* — Chuck Huynh
(74) *Attorney, Agent, or Firm* — Warner Norcross + Judd LLP

(57) ABSTRACT

A system and method for determining location information based on a reference profile for a reference device, and a system and method for determining the reference profile. The system may determine the reference locator with respect to the reference device based on a plurality of samples obtained with respect to communications between the reference device and an object device. An adapter locator may be determined for the reference locator for samples obtained with respect to communications between a test device and object.

13 Claims, 10 Drawing Sheets

(51) Int. Cl.
  *H04W 4/40* (2018.01)
  *H04B 17/11* (2015.01)
  *H04W 84/12* (2009.01)

(56) References Cited

U.S. PATENT DOCUMENTS

2005/0266855 A1 12/2005 Zeng et al.
2019/0208381 A1* 7/2019 Booij .................... G01S 1/74

* cited by examiner

| DISTANCE METERS | GOLDEN (RSSI) | DEVICE A (RSSI) | DEVICE A (COMPUTED DISTANCE) | DEVICE B (RSSI) | DEVICE B (COMPUTED DISTANCE) |
|---|---|---|---|---|---|
| 0 | -45 | -51 | 1 | -39 | 0 |
| 1 | -51 | -57 | 2 | -45 | 0 |
| 2 | -57 | -63 | 4 | -51 | 1 |
| 4 | -63 | -69 | 8 | -57 | 2 |
| 8 | -69 | -75 | 16 | -63 | 4 |
| 16 | -75 | -81 | 32 | -69 | 8 |

ACTUAL VS. COMPUTED DISTANCE (IGNORING RECEIVE POWER VARIATION)

ACTUAL VS. COMPUTED DISTANCE (IGNORING RECEIVE POWER VARIATION)

| DISTANCE METERS | iPHONE 6S (RSSI) | iPHONE 6S (COMPUTED DISTANCE) |
|---|---|---|
| 1 | -53.11 | 1.5 |
| 2 | -56.19 | 2.2 |
| 3 | -57.68 | 2.8 |
| 4 | -61.32 | 4.1 |
| 5 | -62.80 | 5.3 |
| 6 | -64.50 | 6.1 |
| 7 | -64.45 | 6.1 |
| 8 | -66.43 | 7.8 |
| 9 | -67.29 | 8.9 |
| 10 | -67.51 | 10.1 |
| 11 | -69.49 | 11.5 |
| 12 | -70.04 | 13.1 |
| 13 | -71.83 | 17.0 |
| 14 | -72.99 | 19.3 |
| 15 | -72.98 | 19.3 | iPHONE S6 ACTUAL VS. COMPUTED DISTANCE (WITH RECEIVE POWER VARIATION)

Fig. 13 iPHONE S6 ACTUAL VS. COMPUTED DISTANCE (WITH RECEIVE POWER VARIATION)

SYSTEM AND METHOD OF CALIBRATION FOR ESTABLISHING REAL-TIME LOCATION

FIELD OF THE INVENTION

The present application relates to a system and method for calibrating and determining location information with respect to a portable device and an object, such as a vehicle.

BACKGROUND

Real-time location or position determinations for objects have become increasingly prevalent across a wide spectrum of applications. Real-time locating systems (RTLS) are used and relied on for tracking objects, such as portable devices, in many realms including, for example, automotive, storage, retail, security access for authentication, and security access for authorization.

One conventional RTLS system in the automotive realm includes a transceiver or master controller located within a vehicle and capable of communicating via radio frequency (RF) with a portable device. One or more aspects of the communications between the master controller and the portable device, such as signal strength of the communications, may be monitored and used as a basis for determining a location of the portable device relative to the vehicle. For instance, if the signal strength of communications is low, the portable device may be farther away from the vehicle relative to communications where the signal strength is high. In general, the strength of communications drops off as the distance increases between the portable device and the vehicle.

Using a function based on the relationship between signal strength and distance, the location of the portable device relative to the vehicle can be computed. However, the accuracy of the function is likely to vary significantly from application to application and among different environments. A function may be considered accurate for one system under set conditions, and then provide a result that is significantly inaccurate under different conditions or with a slightly different system.

Efforts have been made to calibrate the function used to determine the location of the portable device relative to the vehicle. For instance, in the context of the portable device being a phone and the object being a vehicle, the function may be considered accurate for one type of phone (e.g., an Apple iPhone) but that same function may provide inconsistent or inaccurate results for another type of phone (e.g., a Samsung Galaxy). However, due to the large number of environmental factors and conditions, e.g., differing phone types and differing vehicle constructions, the user is conventionally left with a set of instructions to calibrate their specific phone with their specific vehicle. This way, the user can attempt to avoid effects caused by environmental variations and physical differences. However, this reliance on the user to calibrate their own system can lead to user frustration when the system is inaccurate because the user failed to follow or misunderstood calibration instructions.

SUMMARY

A system and method are provided for determining location information based on a reference profile for a reference device. A reference locator may be determined with respect to the reference device based on a plurality of samples obtained with respect to communications between the reference device and an object device. An adapter locator may be determined for the reference locator based on samples obtained with respect to communications between a test device and object.

In one embodiment, a system is provided for determining location information pertaining to a location of a portable device relative to an object. The system may include an object device and a controller configured to determine location information about the portable device relative to the object. The object device may be disposed in a fixed position relative to the object, and may include an antenna configured to communicate wirelessly with the portable device via a communication link.

The controller may include an adapter locator configured to store a device-type parameter associated with a signal characteristic of communications between the portable device and the antenna, where the device-type parameter corresponds to a device-type of the portable device. The controller may include a reference locator coupled to the adapter locator, where the reference locator may be configured to obtain from memory one or more reference parameters operable to facilitate determining location information based on a signal characteristic of communications wirelessly transmitted between a reference device and said device. The adapter locator may be configured to affect an output of the reference locator based on the device-type parameter.

The controller may be configured to obtain the device-type parameter corresponding to the device-type of the portable device, and to determine location information with respect to the portable device relative to the object based on output from the adapter locator and the signal characteristic of communications wirelessly transmitted between the portable device and the object device.

A method of calibrating a system for determining location information pertaining to a location of a remote device relative to an object device is provided. The method may include providing a reference device capable of communicating wirelessly with the object device via a communication link, and obtaining a plurality of reference-device calibration samples for a reference-device signal characteristic of communications with the reference device at a plurality of positions relative to the object device. The method may also include obtaining a plurality of remote device calibration samples for a remote device signal characteristic of communications with the remote device at a plurality of positions relative to the object device, and determining one or more reference parameters for a reference locator based on the plurality of reference-device calibration samples.

One or more adapter parameters may be determined for an adapter locator based on the plurality of remote device calibration samples, where the adapter locator is configured to affect an output of the reference locator.

In one embodiment, a method is provided for determining location information pertaining to a location of a portable device relative to an object. The method may include providing an object device in a fixed position relative to the object, and retrieving from memory a user device-type parameter associated with a user-device signal characteristic of communications between the object device and the portable device, where the user device-type parameter is associated with a device-type of the portable device. The method may also include obtaining one or more samples of the user-device signal characteristic with respect to communications between the portable device and the object device.

A reference locator may be provided that is calibrated to determine location information based on a reference-device signal characteristic of communications wirelessly transmitted between a reference portable device and the object device.

Location information pertaining to a location of the portable device relative to the object may be determined based on the reference locator, the one or more samples of the user-device signal characteristic, and the user device-type parameter.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 13 shows actual versus computed distance with receive power variation in accordance with one embodiment.

DETAILED DESCRIPTION

Figure 1:
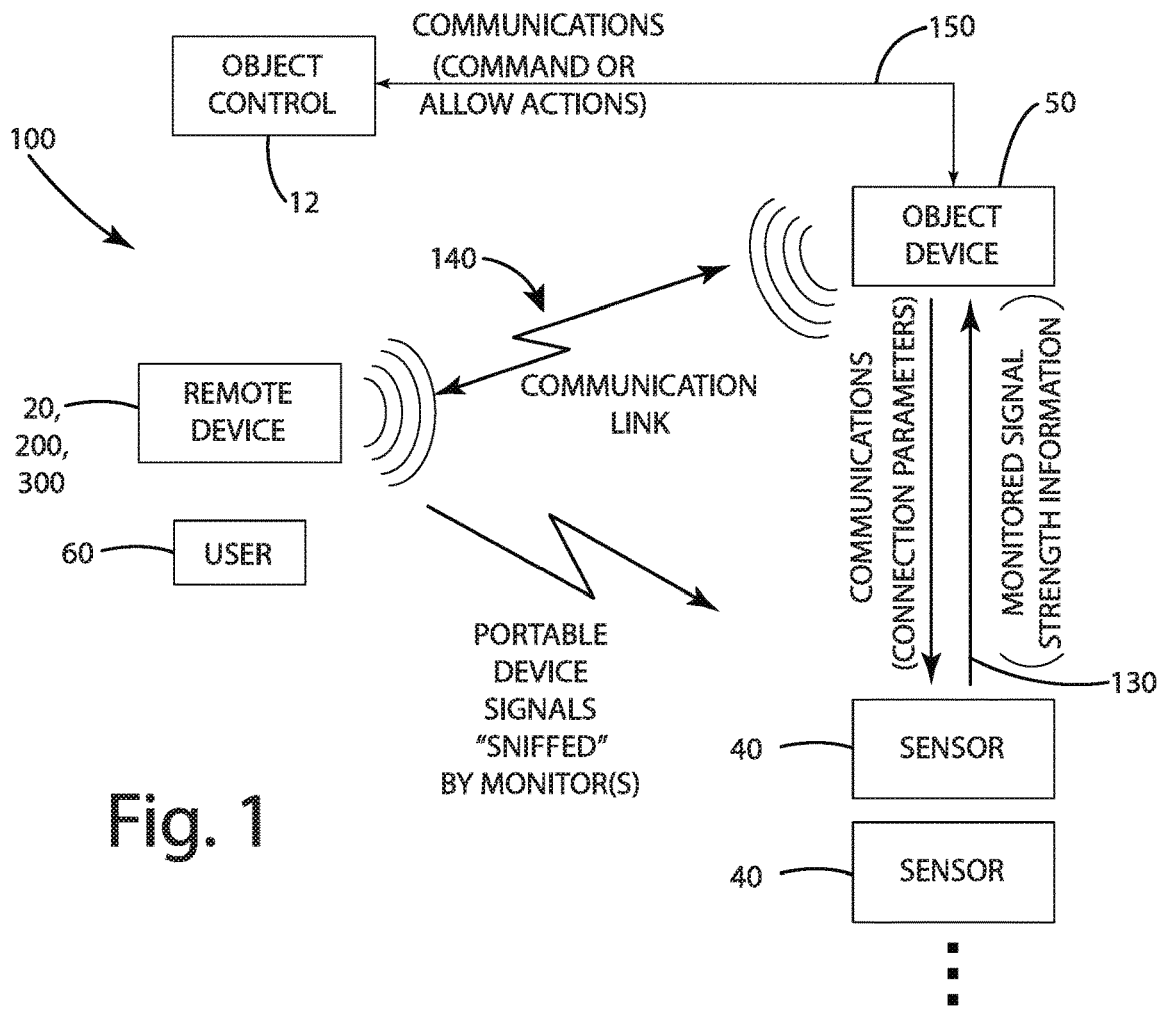
FIG. 1 shows a representative view of a system in accordance with one embodiment.

A system and method for determining location information based on a reference locator for a reference device, and a system and method for determining the reference locator are provided. The system may determine the reference locator with respect to the reference device based on a plurality of samples obtained with respect to communications between the reference device and an object device. The object device may be disposed on an object, such as a vehicle, and may be capable of communicating wirelessly with the reference device. The system may determine an adapter locator for the reference locator for samples obtained with respect to communications between a test device and an object device, optionally disposed on a test object different from the object used in conjunction with the reference device in determining the reference locator.

In one embodiment, for a remote device, potentially having a type different from the reference device, a plurality of samples may be obtained with respect to communications between the remote device and the object device to determine an adapter locator for adapting the reference locator. The adapter locator may be configured to determine location information with respect to the remote device based on the reference locator but adapted in accordance with one or more parameters of the adapter locator.

To provide an example, the reference locator may be trained on a table of the plurality of samples obtained with respect to communications between the reference device and the object device. The plurality of samples may include one or more signal characteristics of the communications. Example signal characteristics include signal strength (RSSI), angle of arrival (AOA), and time-of-flight (TOF). The samples may be obtained in the object device or may be communicated from a sensor object device to the object device.

The table may also include truth information or truth data for each sample. The truth information may correspond to one or more outputs, which may include an expected output, an observed position, or an observed parameter, or a combination thereof. For example, the observed position may pertain to an actual position, or being in a particular zone (e.g., inside, outside, left, right, front or rear of a vehicle), orientation, or environment (e.g., in a purse or a person's hand), or any combination thereof.

In one embodiment, a plurality of samples and associated truth information may form the basis of a training data set (and potentially a validation data set) for a machine learning algorithm to vary one or more parameters of the reference locator. The reference locator in conjunction with the one or more parameters may be capable of providing one or more outputs based on a sample of the one or more signal characteristics of communication. The sample may be provided to the reference locator in order to obtain or generate the one or more outputs, which may closely relate to truth information obtained with respect to the sample (assuming the one or more parameters are tuned for the training set). The reference locator may be trained within a degree of confidence for the training data set so that the one or more outputs obtained from the reference locator with respect to a sample may be considered accurate to within the established degree of confidence.

In one embodiment, the reference locator may include one or more core functions and a plurality of tunable parameters associated with the one or more core functions. The plurality of tunable parameters may be adjusted so that the reference locator provides one or more outputs, based on one or more inputs (e.g., the samples), that are similar to the truth information. A gradient descent optimization algorithm may be utilized to adjust the tunable parameters in conjunction with a score function. In addition to or alternative to the score function, an error function may be utilized, such as mean square error. The score function may provide a score corresponding to similarity between the one or more outputs of the reference locator and the truth information. The gradient descent optimization algorithm may be configured to adjust the tunable parameters to substantially maximize the score of the score function or the similarity between the one or more outputs of the reference locator and the truth information.

As discussed herein, a system and method are provided for determining location information for a remote device relative to an object. The system and method may be adapted to determine such location information for different types of remote devices and different types of objects. To provide an example, the remote device may be a Phone as a Key (PaaK) or a smart phone and the object may be a vehicle. More specifically, in this example, the system and method may be adapted to determine location information with respect to an iPhone 6s and a 2018 Toyota Corolla, and may also be adapted to determine location information with respect to a Samsung Galaxy S9 and a 2018 Ford Explorer.

The reference device and reference locator determined for the reference device may be used as a basis for training an adapter locator to determine the location information with respect to the object. The system and method in accordance with one embodiment may include determining a plurality of adapter locators for a plurality of remote devices for a plurality of objects. For instance, a first adapter locator may be trained for an iPhone 6s and a 2018 Toyota Corolla, a second adapter locator may be trained for the iPhone 6s and a 2018 Ford Explorer, a third adapter locator may be trained for a Samsung Galaxy S9 and the 2018 Toyota Corolla, and a fourth adapter locator may be trained for the Samsung Galaxy S9 and the 2018 Ford Explorer.

In one embodiment, rather than training a reference locator for each type of remote device and for each type of object, a reference locator may be trained with respect to a reference device for each type of object (e.g., each vehicle make and model) and supplemental parameters may be tuned for an adapter locator in conjunction with other devices. Additionally or alternatively, the reference locator may be trained with respect to the reference device and a subset of reference objects, which are selected from a larger set of objects. Optionally, the subset of reference objects may include a single reference object.

The reference locator that is trained with samples and truth information obtained for the reference device and an object (or the reference device and a reference object) may form the basis for training an adapter locator for different types of devices or different types of objects, or both.

The adapter locator may be configured to adapt at least one of the following: one or more of the inputs to the reference locator, one or more parameters of the reference locator, and one or more outputs of the reference locator. The adapter locator may be configured to vary one or more tuning parameters of the reference locator, which may or may not have been tuned during training of the reference locator. Additionally, or alternatively, the adapter locator may include one or more adapter core functions configured to vary the inputs or the outputs respectively based on one or more tuning parameters of the adapter locator.

The adapter locator may be trained based on a plurality of samples and truth information obtained with respect to a test device (with a type different from the reference device) and the object used in conjunction with training the reference locator. In an alternative embodiment, the object may be a test object different from the object used in conjunction with training the reference locator. In another alternative embodiment, the adapter locator may be trained with respect to the reference device and a test object different from the one used in conjunction with training the reference locator. This way, an adapter locator may be developed for different types of objects.

The adapter locator may be used in conjunction with the reference locator to provide output within a degree of confidence that corresponds to the truth information obtained for the samples obtained for the test device, or the test object, or both. The number of parameters or the complexity of the adapter locator may be significantly less than the reference locator, thereby facilitating storage of a plurality of adapter locators for various configurations in less space than would otherwise occur if a reference locator were trained for each combination of devices and objects.

To provide an example, the adapter locator may include one or two parameters (although the present disclosure is not so limited) that may be tuned during training in conjunction with the reference locator to generate one or more outputs, based on samples for a test device and truth information for the samples.

In a more specific example, each of the samples may include a signal strength of communications, such as RSSI, between an object device and a test device. The parameter may be a global offset value of the reference locator, which is not varied during training of the reference locator. The global offset value may offset the signal strength processed by the reference locator. Alternatively, the adapter locator may be configured to offset the signal strength prior to being input to the reference locator. By varying the global offset value in accordance with a scoring function during training of the adapter locator, the output of the adapter locator may operate in conjunction with the reference locator to provide an output that corresponds to the truth information obtained for the test device within a degree of confidence. A gradient descent optimization algorithm or other optimization algorithm may be used in conjunction with the scoring function to train the adapter locator and its one or more parameters to generate output initially similar to the truth information.

The adapter locator in accordance with one embodiment is not limited to modification of one or more parameters of the reference locator. The adapter locator may be configured to vary the one or more inputs provided to the reference locator, to vary one or more internal parameters of the reference locator, or to vary one or more of the outputs provided from the reference locator, or any combination thereof.

It is noted that in one embodiment the parameters for the adapter locator may be stored separately from the object or object control, and may be provided to the object or object control based on information about the type of device being located. The object or object control 12 may retrieve the parameters for the adapter locator (e.g., offsets for the device) from the cloud or external server device based on the type of device being located. Alternatively, the device, itself, may provide this information, adapter parameters, to the object or object control 12. The device may have obtained this information from the cloud beforehand or in response to a request from the object 10 or object control 12. In yet another alternative, the actual device may be calibrated to work with the object 10, determine and store adapter parameters, and provide such parameters to the object 10.

In one embodiment, in a Bluetooth Low Energy (BLE) PaaK system that uses RSSI measurements, a calibration process is provided for a remote device 20 (e.g., a phone) to determine an average RSSI offset, which may be a value that compensates for the remote device's antenna gain and other construction factors, as averaged across common phone postures (e.g., in hand, in front pocket, in back pocket, in purse, etc.), that contribute to the transmission of signals to/from the object (e.g., a vehicle), relative to a "golden device" also described as a reference device (from which the vehicle's algorithm calibrations can be based). In other words, the result of the calibration process in one embodiment is an offset that is applied to RSSI measurements for each remote device 20 within a vehicle-based RSSI measurement system.

The calibration process in one embodiment may result in more than one value—such as an RSSI offset and a variability indicator—but, for purposes of discussion, one or more embodiments herein are described in conjunction with tuning one parameter—an RSSI offset. For example, the "golden device" may be an iPhone 6 or a BLE key fob (offset 0) and an Android Galaxy S7 may use an offset of +8; conversely, the Galaxy S7 may be the "golden device" (offset 0) and an iPhone 6 may then use an offset of −8. The variability indicator may be representative of relative variation in one or more measured values (e.g., RSSI) with respect to different orientations of the device. For instance, if the device is provided at a first position defined as the device being at a first orientation and a first location, the RSSI value may vary or be different relative to an RSSI value at a second position defined as the device being at a second orientation but at the same first location. Different devices may have different degrees of variability.

I. System Overview

Figure 2:
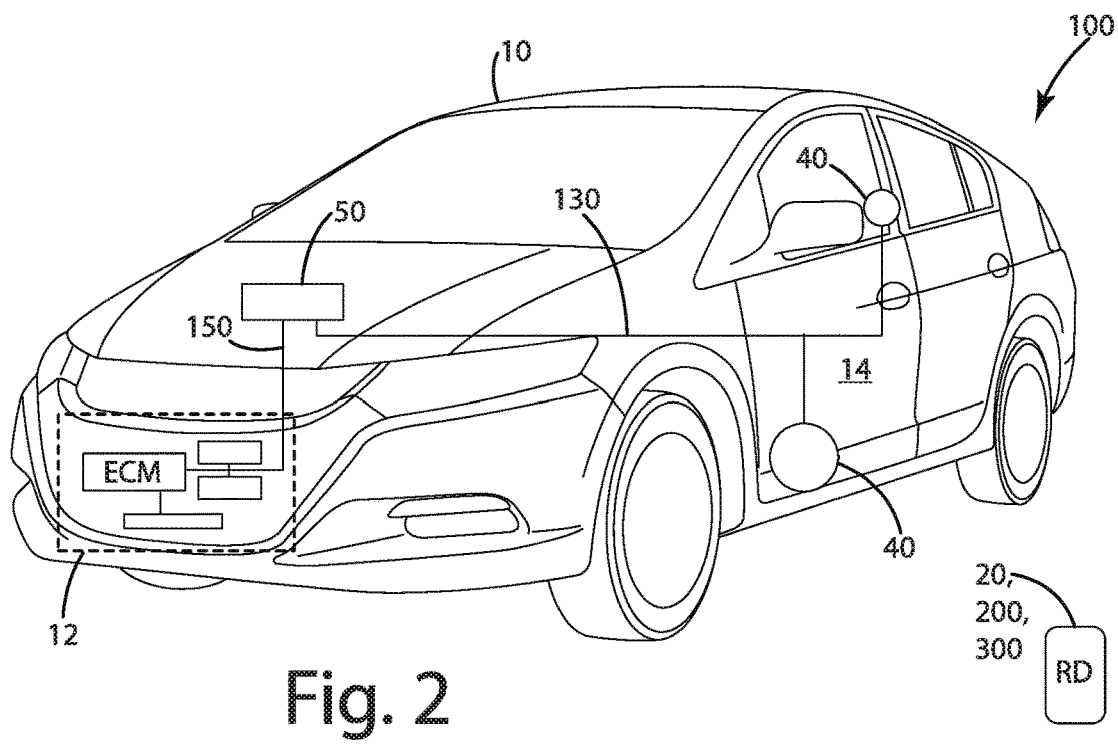
FIG. 2 depicts a representative view of the system in FIG. 1 disposed at least in part on an object.

A system in accordance with one embodiment is shown in the illustrated embodiment of FIGS. 1 and 2 and generally designated 100. The system 100 may include one or more system components as outlined herein. A system component may be a user 60 or an electronic system component, which may be the remote device 20 (e.g., a portable device), a sensor 40, or an object device 50, or a component including one or more aspects of these devices. The underlying components of the object device 50, as discussed herein, may be configured to operate in conjunction with any one or more of these devices. In this sense, in one embodiment, there may be several aspects or features common among the remote device 20, the sensor 40, and the object device 50. The features described in connection with the object device 50 depicted in FIG. 3 may be incorporated into the remote device 20 or the sensor 40, or both. In one embodiment, the object device 50 may form an equipment component disposed on an object 10, such as a vehicle or a building. The object device 50 may be communicatively coupled to one or more systems of the object 10 to control operation of the object 10, to transmit information to the one or more systems of the object 10, or to receive information from the one or more systems of the object 10, or a combination thereof. For instance, the object 10 may include an object controller 12 configured to control operation of the object 10. The object 10 may include one or more communication networks, wired or wireless, that facilitate communication between the object controller 12 and the object device 50. The communication network for facilitating communications between the object device 50 and the object controller 12 is designated 150 in the illustrated embodiment of FIG. 2 and provided as a CAN bus; however, it is to be understood that the communication network is not so limited. The communication network may be any type of network, including a wired or wireless network, or a combination of two or more types of networks.

Figure 3:
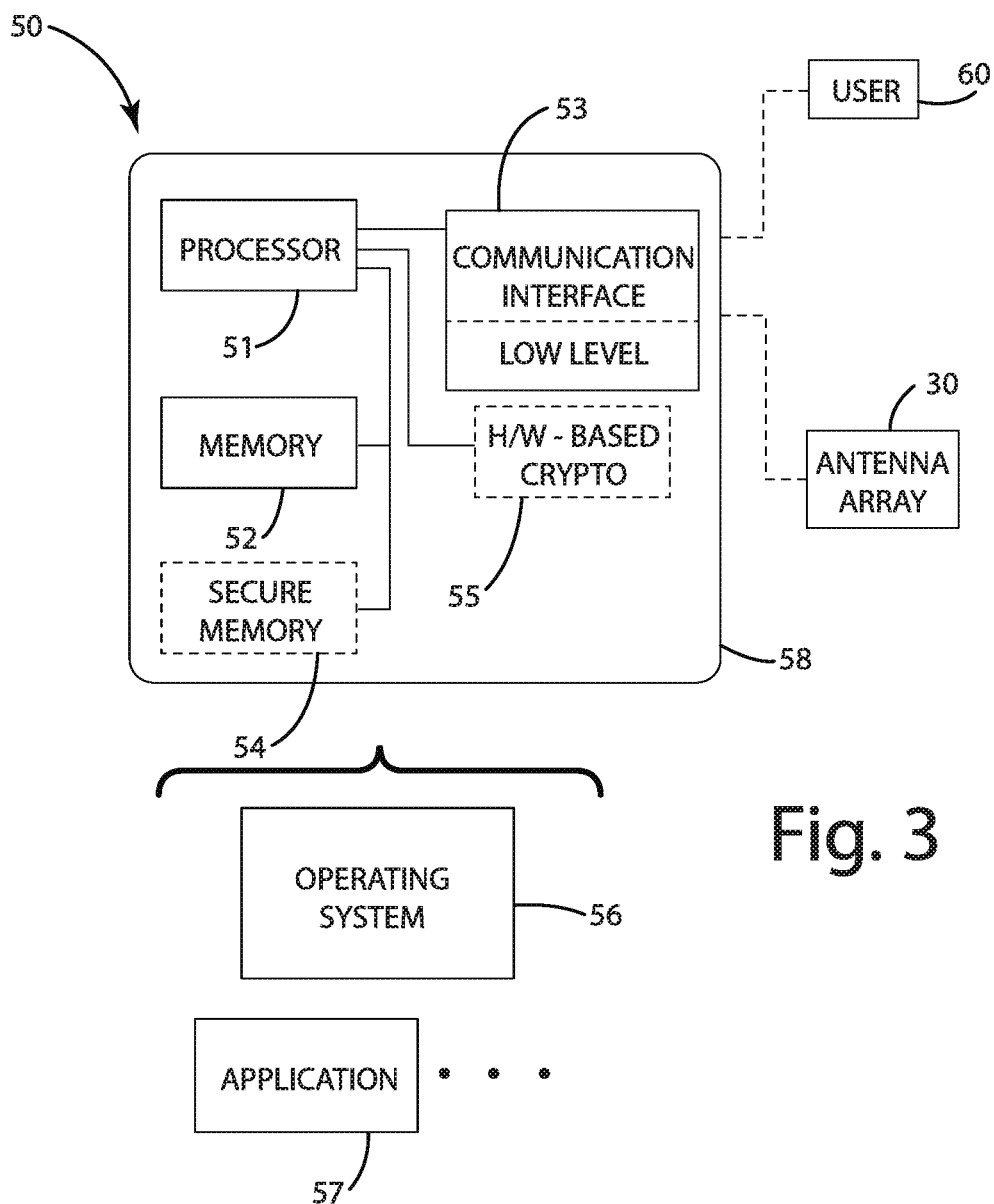
FIG. 3 shows a system component in accordance with one embodiment.

In the illustrated embodiment of FIG. 3, the object device 50 may include a control system or controller 58 configured to control operation of the object device 50 in accordance with the one or more functions and algorithms discussed herein, or aspects thereof. The system components, such as the remote device 20 or the sensor 40, or both, may similarly include a controller 58.

The controller 58 includes electrical circuitry and components to carry out the functions and algorithms described herein. Generally speaking, the controller 58 may include one or more microcontrollers, microprocessors, and/or other programmable electronics that are programmed to carry out the functions described herein. The controller 58 may additionally or alternatively include other electronic components that are programmed to carry out the functions described herein, or that support the microcontrollers, microprocessors, and/or other electronics. The other electronic components include, but are not limited to, one or more field programmable gate arrays, systems on a chip, volatile or nonvolatile memory, discrete circuitry, integrated circuits, application specific integrated circuits (ASICs) and/or other hardware, software, or firmware. Such components can be physically configured in any suitable manner, such as by mounting them to one or more circuit boards, or arranging them in other manners, whether combined into a single unit or distributed across multiple units. Such components may be physically distributed in different positions in the object device 50, or they may reside in a common location within the object device 50. When physically distributed, the components may communicate using any suitable serial or parallel communication protocol, such as, but not limited to, CAN, LIN, Vehicle Area Network (VAN), FireWire, I2C, RS-232, RS-485, and Universal Serial Bus (USB).

As described herein, the terms locator, module, model, and generator designate parts of the controller 58. For instance, a model or locator in one embodiment is described as having one or more core functions and one or more parameters that affect output of the one or more core functions. Aspects of the model or locator may be stored in memory of the controller 58, and may also form part of the controller configuration such that the model is part of the controller 58 that is configured to operate to receive and translate one or more inputs and to output one or more outputs. Likewise, a module or a generator are parts of the controller 58 such that the controller 58 is configured to receive an input described in conjunction with a module or generator and provide an output corresponding to an algorithm associated with the module or generator.

The controller 58 of the object device 50 in the illustrated embodiment of FIG. 3 may include one or more processors 51 that execute one or more applications 57 (software and/or includes firmware), one or more memory units 52 (e.g., RAM and/or ROM), and one or more communication interfaces 53, amongst other electronic hardware. The object device 50 may or may not have an operating system 56 that controls access to lower-level devices/electronics via a communication interface 53. The object device 50 may or may not have hardware-based cryptography units 55 —in their absence, cryptographic functions may be performed in software. The object device 50 may or may not have (or have access to) secure memory units 54 (e.g., a secure element or a hardware security module (HSM)). Optional components and communication paths are shown in phantom lines in the illustrated embodiment.

The controller 58 in the illustrated embodiment of FIG. 3 is not dependent upon the presence of a secure memory unit 54 in any component. In the optional absence of a secure memory unit 54, data that may otherwise be stored in the secure memory unit 54 (e.g., private and/or secret keys) may be encrypted at rest. Both software-based and hardware-based mitigations may be utilized to substantially prevent access to such data, as well as substantially prevent or detect, or both, overall system component compromise. Examples of such mitigation features include implementing physical obstructions or shields, disabling JTAG and other ports, hardening software interfaces to eliminate attack vectors, using trusted execution environments (e.g., hardware or software, or both), and detecting operating system root access or compromise.

For purposes of disclosure, being secure is generally considered being confidential (encrypted), authenticated, and integrity-verified. It should be understood, however, that the present disclosure is not so limited, and that the term "secure" may be a subset of these aspects or may include additional aspects related to data security.

The communication interface 53 may be any type of communication link, including any of the types of communication links describe herein, including wired or wireless. The communication interface 53 may facilitate external or internal, or both, communications. For instance, the communication interface 53 may be coupled to or incorporate the antenna array 30. The antenna array 30 may include one or more antennas configured to facilitate wireless communications, including BLE communications.

As another example, the communication interface 53 may provide a wireless communication link with another system component in the form of the remote device 20, such as wireless communications according to the WiFi standard. In another example, the communication interface 53 may be configured to communicate with an object controller 12 of a vehicle (e.g., a vehicle component) via a wired link such as a CAN-based wired network that facilitates communication between a plurality of devices. The communication interface 53 in one embodiment may include a display and/or input interface for communicating information to and/or receiving information from the user 60.

In one embodiment, the object device 50 may be configured to communicate with one or more auxiliary devices other than another object device 50 or a user. The auxiliary device may be configured differently from the object device 50—e.g., the auxiliary device may not include a processor 51, and instead, may include at least one direct connection and/or a communication interface for transmission or receipt, or both, of information with the object device 50. For instance, the auxiliary device may be a solenoid that accepts an input from the object device 50, or the auxiliary device may be a sensor (e.g., a proximity sensor) that provides analog and/or digital feedback to the object device 50.

The system 100 in the illustrated embodiment may be configured to determine location information in real-time with respect to the remote device 20. In the illustrated embodiments of FIGS. 1 and 2, the user 60 may carry the remote device 20 (e.g., portable device such as a smartphone). The system 100 may facilitate locating the remote device 20 with respect to the object 10 (e.g., a vehicle) in real-time with sufficient precision to determine whether the user 60 is located at a position at which access to the object 10 or permission for an object command should be granted.

For instance, in an embodiment where the object 10 is a vehicle, the system 100 may facilitate determining whether the remote device 20 is outside the vehicle but in close proximity, such as within 5 feet, 3 feet, or 2 feet or less, to the driver-side door 14. This determination may form the basis for identifying whether the system 100 should unlock the vehicle. On the other hand, if the system 100 determines the remote device 20 is outside the vehicle and not in close proximity to the driver-side door (e.g., outside the range of 2 feet, 3 feet, or 5 feet), the system 100 may determine to lock the driver-side door. As another example, if the system 100 determines the remote device 20 is in close proximity to the driver-side seat but not in proximity to the passenger seat or the rear seat, the system 100 may determine to enable mobilization of the vehicle. Conversely, if the remote device 20 is determined to be outside close proximity to the driver-side seat, the system 100 may determine to immobilize or maintain immobilization of the vehicle.

The object 10 may include multiple object devices 50 or variant thereof, such as an object device 50 including a sensor 40 coupled to an antenna array 30, in accordance with one or more embodiments described herein.

Micro-location of the remote device 20 may be determined in a variety of ways, such as using information obtained from a global positioning system, one or more signal characteristics of communications from the remote device 20, and one or more sensors (e.g., a proximity sensor, a limit switch, or a visual sensor), or a combination thereof. An example of micro-location techniques for which the system 100 can be configured are disclosed in U.S. Non-provisional patent application Ser. No. 15/488,136 to Raymond Michael Stitt et al., entitled SYSTEM AND METHOD FOR ESTABLISHING REAL-TIME LOCATION, filed Apr. 14, 2017—the disclosure of which is hereby incorporated by reference in its entirety.

In one embodiment, in the illustrated embodiment of FIGS. 1-3, the object device 50 (e.g., a system control module (SCM)) and a plurality of sensors 40 (coupled to an antenna array 30) may be disposed on or in a fixed position relative to the object 10. Example use cases of the object 10 include the vehicle identified in the prior example, or a building for which access is controlled by the object device 50.

The remote device 20 may communicate wirelessly with the object device 50 via a communication link 140. The plurality of sensors 40 may be configured to sniff the communications of the communication link 140 between the remote device 20 and the object device 50 to determine one or more signal characteristics of the communications, such as signal strength or angle of arrival, or both. The determined signal characteristics may be communicated or analyzed and then communicated to the object device 50 via a communication link 130 separate from the communication link 140 between the remote devices 20 and the object device 50.

Additionally, or alternatively, the remote device 20 may establish a direct communication link with one or more of the sensors 40, and the one or more signal characteristics may be determined based on this direct communication link.

Figure 15:
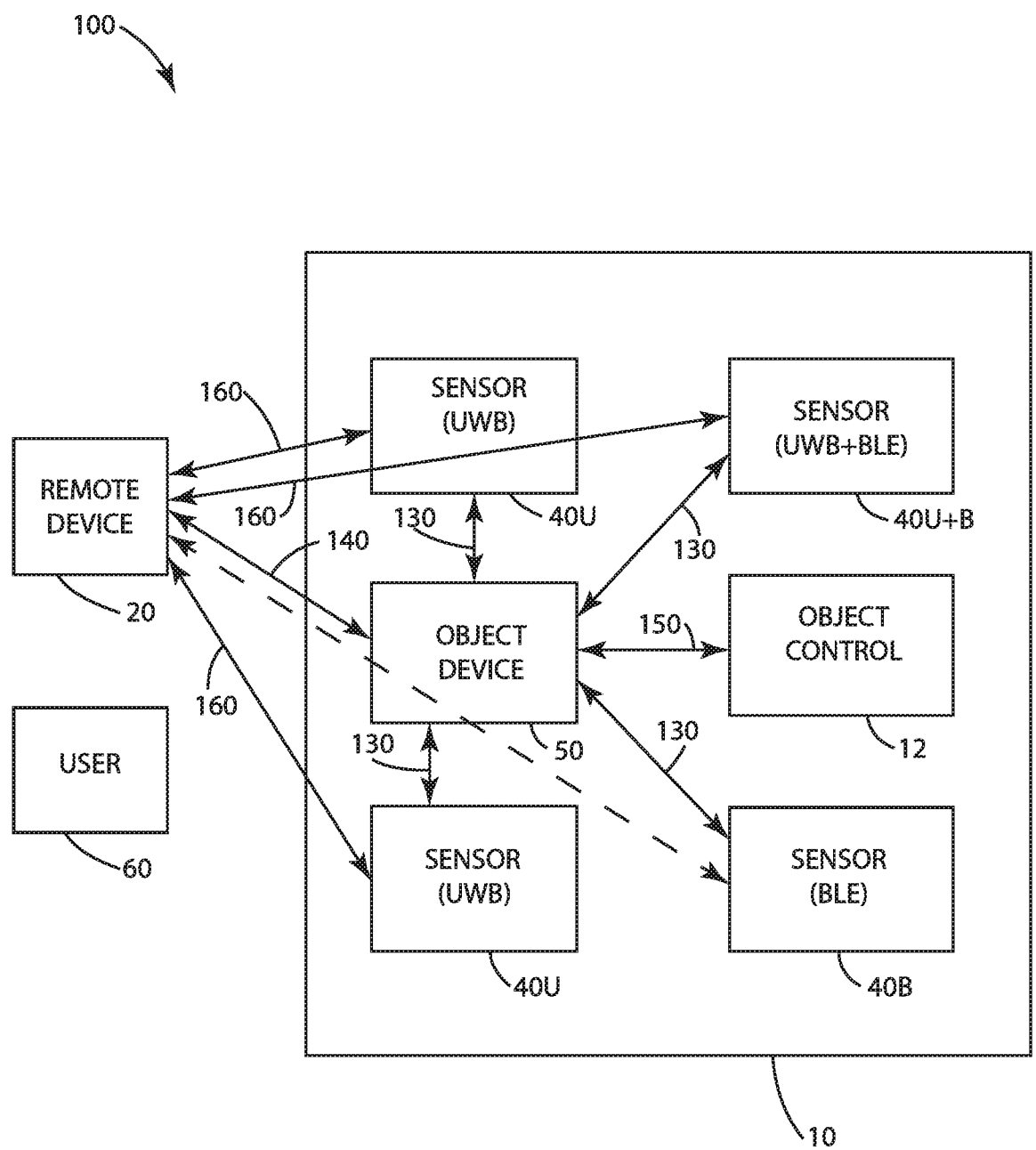
FIG. 15 shows a representative view of a system in accordance with one embodiment.

For instance, an alternative configuration of the system 100 is shown in the illustrated embodiment of FIG. 15. The system 100 may include a remote device 20, a user 60, and an object 10, similar to the system described in conjunction with FIG. 1. The object 10 in accordance with one embodiment may include an object device 50, an object control 12, and a plurality of sensors, which may be similar to the sensors 40 described herein.

In the illustrated embodiment, the remote device 20 may include both Ultra Wide Band (UWB) and BLE communication capabilities. For instance, the remote device 20 may be a portable device in the form of a smartphone with both UWB and BLE radios.

The system 100 in the illustrated embodiment of FIG. 15 may include one or more sensors 40 (which may also described as anchors) that are disposed on the object 10. The one or more sensors 40 may be disposed in a variety of positions on the object 10, such as the positions described herein, including for instance, one or more sensors 40 in the door panel and one or more other sensors in the B pillar, as shown and described in connection with FIG. 2.

One or more of the sensors 40 may be operable to communicate via at least one communication link according to a communication protocol. The communication link may be established via one or more channels. As described in connection with FIG. 2, the sensor 40 may be operable to communicate by sniffing or receiving communications via a at least one communication link 140 established between the object device 50 and the remote device 20, such that the sensor 40 does not transmit communications via the communication link 140. This type of communications for the sensor 40 is shown as a phantom line in FIG. 15.

However, one or more sensors 40 in the system 100 of FIG. 15 may be operable to communicate by transmitting and receiving communications via at least one communication link 160 established directly with the remote device 20. In this way, the sensor 40 may directly communicate with the remote device 20. The at least one communication link 160 may include communications according to more than one protocol (e.g., BLE and UWB).

The one or more sensors 40 of the system 100 in the illustrated embodiment of FIG. 15 may be operable to a) sniff communications with respect to the communication link 140 between the remote device 20 and the object device 50, orb) directly communicate with the remote device 20 via the at least one communication link 160. The communication capabilities of the one or more sensors 40 in the illustrated embodiment is identified in the figure and by a letter designation U for UWB and B or BLE. For example, the sensor 40U is an ultra-wideband anchor responsive to UWB signals; sensor 40U+B is responsive to both UWB and BLE communications; and sensor 40B is a BLE anchor.

It is to be understood that an object 10, such as a vehicle, may include more sensors 40 than shown in the illustrated embodiment of FIG. 15. Depending on the implementation, some number of anchors may be integrated in a vehicle. For instance, 3 to 10 anchors with both UWB and BLE capabilities may be provided.

In one embodiment, UWB, similar to BLE, is a standardized communication protocol (see IEEE 802.15.4a/z). One way in which UWB may differ from BLE is with respect to ranging applications. UWB may involve transmitting short duration pulses that allow for time-of-flight functions to be used to determine the range from the remote device 20 to one or more sensors 40U, 40U+B (e.g., anchors). Then the object device 50 may use a lateration function and/or a multilateration function to determine localization with respect to the remote device 20 (e.g., the location of the remote device 20 relative to the object 10). Lateration and/or multilateration may involve processing a set of ranges from the remote device 20 to each sensor 40 to output a position estimate of the remote device 20 relative to the object 10). The remote device 20 and the UWB-enabled sensors 40U, 4OUB may transmit and receive packets of data back-and-forth, enabling a time-of-flight determination with respect to such communications.

The system 100 in the illustrated embodiment of FIG. 15 may include at least two different communication links for determining localization. For instance, the communication link 140 may utilize BLE-based localization, and the communication link 160 may utilize UWB-based localization. In the illustrated embodiment, the communication link 160 is designated with respect to each of the sensors 40U, 40U+B; however, it is to be understood that each of these communication links 160 may not be the same. For instance, each of the communication links 160 may be separate (e.g., a separate channel or band).

Utilizing multiple communication links for localization may provide a number of benefits.

For instance, in a configuration in which both BLE and UWB information are obtained, this information can be combined to enhance and stabilize a localization estimate. The BLE and UWB channels used in the localization may involve different frequencies, and the signal characteristics to be exploited for ranging are different (RSSI for BLE and time-of-flight for UWB).

RSSI ranging calibration may be augmented or supplemented with time-of-flight from UWB communications. This augmentation or supplemental use of time-of-flight may be conducted in real-time by the system 100, or conducted in a manner to adapt a model that uses sensed information not based on UWB communications (e.g., only sensed information with respect to BLE communications).

For instance, one embodiment according to the present disclosure may be directed toward calibrating out variance of RSSI or range calculations. BLE+UWB capable remote devices 20 may be tested to build up a map of BLE communication characteristics, UWB communication characteristics, and ranging or localization data. A BLE-only remote device 20 may be operable to process such maps but without UWB communications characteristics to refine RSSI-only range estimates. For instance, the reference locator 210 may be based on both BLE+UWB communication characteristics, and the adapter locator 310 may be based on BLE communication characteristics without the UWB communication characteristics. Alternatively, the reference locator 210 may be based on BLE communication characteristics, and the adapter locator 310 may be based on both UWB and BLE communication characteristics. It is to be understood that BLE or UWB, or both, may be replaced with another type of communication protocol.

The remote device 20, in one embodiment, can establish a direct communication link 160 with one or more of the sensors 40U, 40U+B, and the one or more signal characteristics (e.g., time-of-flight) may be determined based on this direct communication link 160.

As described herein, one or more signal characteristics, such as signal strength and angle of arrival, may be analyzed to determine location information about the remote device 20 relative to the object 10, an aspect of the object 10, or the object device 50, or a combination thereof. For instance, time difference of arrival or the angle of arrival, or both, among the sensors 40 and the object device 50 may be processed to determine a relative position of the remote device 20. The positions of the one or more antenna arrays 30 relative to the object device 50 may be known so that the relative position of the remote device 20 can be translated to an absolute position with respect to the antenna arrays 30 and the object device 50.

Additional or alternative examples of signal characteristics may be obtained to facilitate determining position according to one or more algorithms, including a distance function, trilateration function, a triangulation function, a lateration function, a multilateration function, a fingerprinting function, a differential function, a time of flight function, a time of arrival function, a time difference of arrival function, an angle of departure function, a geometric function, etc., or any combination thereof.

II. Reference Locator Tuning

Figure 4:
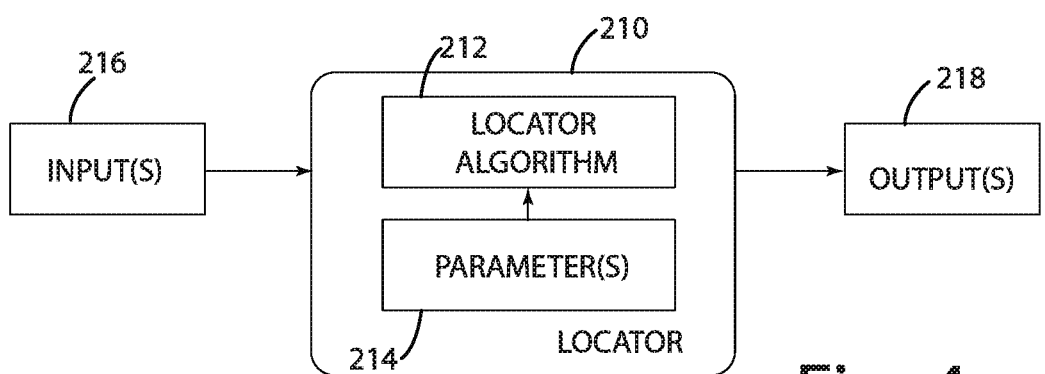
FIG. 4 shows a reference locator of the system in accordance with one embodiment.

The system 100 in the illustrated embodiments of FIGS. 1, 2 and 4 may be configured to tune a reference locator 210 for determining location information with respect to a reference device 200 relative to the object 10, for which an object device 50 is disposed in a fixed relationship. The reference device 200 may be a type of remote device 20, which can be selected according to one or more criteria, such as a prevalence or popularity of the type of remote device 20. For instance, if a particular model of iPhone happens to have a greater market share than other types of remote devices 20, that particular model of iPhone may be selected as the reference device 200. For purposes of disclosure, the remote device 20 in the illustrated embodiments of FIGS. 1 and 2 is also designated as the reference device 200 and a test device 300, which is described herein. The reference device 200 and the test device 300 may be types of remote devices 20 depending on the configuration, and may be provided in place of the remote device 20 in accordance with one or more embodiments described herein.

In an alternative embodiment, the reference device may be a sensor 40, and the reference locator may be determined in conjunction with the sensor 40 and the object device 50.

In the illustrated embodiment, the reference locator 210 may be based on a locator algorithm 212, such as a core function, that is configured to receive one or more inputs 216 based on communications with the reference device 200 and to generate one or more outputs 218 indicative of a location of the reference device 200 relative to the object 10. The one or more inputs 216 may be one or more signal characteristics of the communications, as described herein, such as signal strength (e.g., RSSI), AOA, and TOF. The one or more inputs 216 may be sensed in the object device 50 and one or more sensors 40, which may be disposed at various locations relative to the object 10. As an example, the one or more inputs 216 may include a signal strength (e.g., RSSI) sensed or obtained by the object device 50 with respect to the communications and a signal strength sensed or obtained by each of the one or more sensors 40 with respect to the communications.

The locator algorithm 212 of the reference locator 210 may be tunable according to a plurality of parameters 214 of the reference locator 210. Example parameters include the following: sensor offsets (e.g., RSSI or AOA offsets, or both), zone offsets (e.g., thresholds and hysteresis parameters), and distance conversion (e.g., constants or equations, or both). Based on the one or more inputs 216 and the values of the plurality of parameters 214, the locator function 212 may provide an output 218 indicative of a location of the reference device 200 relative to the object 10. The locator algorithm 212 may vary from application to application.

Figure 6:
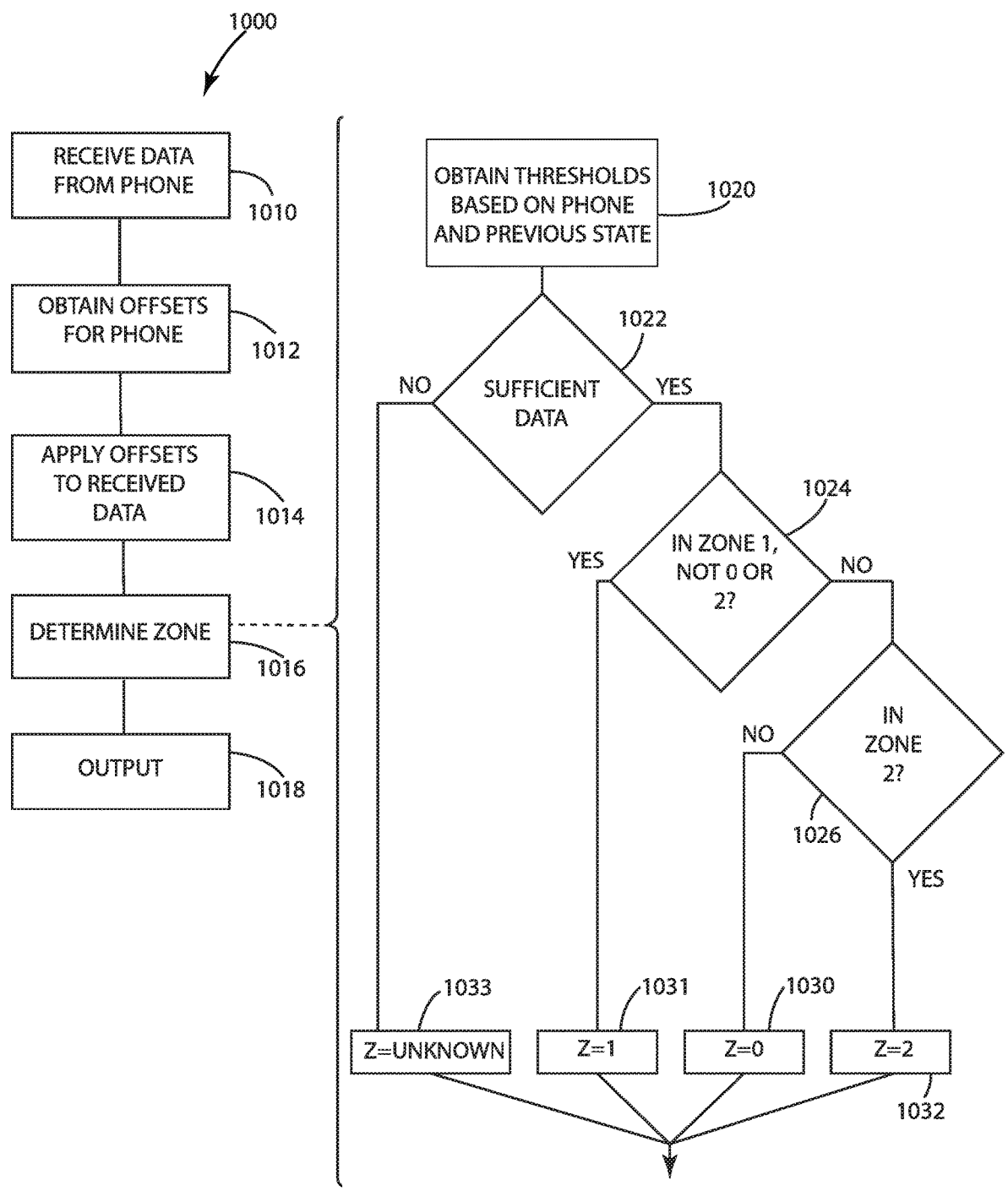
FIG. 6 shows a method of determining location in accordance with one embodiment.

A method of determining location in accordance with one embodiment of the locator algorithm 212 is depicted in FIG. 6 and generally designated 1000. The method of FIG. 6 may include receiving data from the device or inputs 216, obtaining offsets for the device (e.g., reference locator and/or adaptor locator offsets), applying the offsets to the received data, and determining the zone as an output 218 of a locator, such as the reference locator 210 or adapter locator 310. Steps 1010, 1012, 1014, 1016, 1018. The zone determination may include obtaining one or more thresholds based on the type of device and a previous state, which, as an example, may be previous zone determination. Step 1020. The method may include determining if there is sufficient data, and if not, generating an output indicative of the zone being unknown.

Step 1022, 1033. If there is sufficient data, the locator, such as the reference locator 210 or the adapter locator 310, may determine, based on the data, the thresholds, the offsets, variability indicators, hysteresis settings, or another parameter or measurement, or any combination thereof, if the device is located in zone 1 (e.g., inside) and not zone 0 (e.g., far away) or 2 (e.g., near). Step 1024, Step 1031. An alternative set of zones may be driver side (0), inside (1) or passenger side (2)—although it should be understood the present disclosure is not so limited. Based on a similar determination to Step 1024, the locator, such as the reference locator 210 or the adapter locator 310, may determine if the device is in zone 2, and if so, provide an output accordingly. Steps 1026, 1032. If the device is determined not to be in zone 2, the reference locator 210 or the adapter locator 310 may output that the device is in zone 0. Step 1026, 1030.

In another example, locator algorithm 212 may be a neural network (e.g., a convolutional neural network with one or more layers), and the one or more parameters may include weights of nodes within the neural network. As described herein, the weights may be adjusted during training of the reference locator 210 with samples obtained for the reference device 200 and the object 10 and truth information obtained with respect to the samples.

In one embodiment, the reference locator 210 may be trained in conjunction with a system 100 configured for Bluetooth communication, more particularly BLE communications. The BLE specification allows transmitters (e.g., a phone) to change the power at which it transmits (its "transmit power"). For a receiver to compute a distance to a transmitter using a signal strength or RSSI (e.g., using Friis's transmission equation), or to adjust an RSSI measurement to normalize measurements at different transmit powers, the receiver also accounts for the transmit power of the transmitter. The terms "receiver" and "transmitter" are used to describe communications in accordance with one embodiment. It should be understood a device, such as the object device 50, sensor 40 or the remote device 20, or a combination thereof, may operate as a receiver or a transmitter, or both.

In the context of BLE Advertising, when advertising, the transmitter (e.g., a BLE Peripheral, such as a phone, a fob, etc.) is able to control, and communicate as part of the advertisement message, the transmit power. In other words, in a system that measures the RSSI of advertisement messages from an advertising remote device 20, the remote device 20 may communicate transmit power to the system 100, including to one or more object devices 50 or one or more sensors 40, or a combination thereof, forming one or more object receivers (e.g., a vehicle receiver[s]).

Turning to a BLE Data Connection, the transmit power used when advertising may be different from the transmit power used during a data connection. The system 100 may micro-locate, or determine location information about the remote device 20 relative to the object 10, using BLE by measuring the RSSI of data messages to mitigate fast fading and other sources of transmit power variation (as described herein) and RF congestion by operating across the thirty-seven data channels defined within the BLE protocol (as opposed to just one advertising channel).

During a data connection, the system 100 configured for BLE may allow either the Central or the Peripheral to change its transmit power. The devices corresponding to the Central and Peripheral in BLE may vary depending on the application. For instance, the Central may be the object device 50 and the Peripheral may be the remote device 20, or the Central may be the remote device 20 and the Peripheral may be the object device 50. The Central and Peripheral in BLE may change during operation. For instance, the remote device 20 may initially be the Central and the object device 50 may be the Peripheral, and remote device 20 may transition to a Peripheral with the object device 50 transitioning to the Central.

Transmit power may not be communicated as part of a BLE data packet; therefore, in the system 100, where one or more receivers disposed on the object 10 (such as the object device 50 and the sensors 40) measure the RSSI of data messages transmitted from the remote device 20, the one or more receivers may not be aware of the remote device's transmit power, unless the remote device 20 includes this information in the content of a message (or the one or more receivers are able to query a service on the remote device 20 to obtain it).

The system 100 configured for BLE in one embodiment can implement a transmit power service that may be queried to obtain the current transmit power during a connection; however, some remote devices 20 may not be configured for such a service. For instance, conventional iOS and Android phones do not implement this service, nor do they provide access to the current transmit power when connected via operating system Application Programming Interfaces (APIs) to include in a message payload. Some conventional phones use a fixed (constant) transmit power during connections, and thus, the RSSI offset obtained during calibration can encapsulate the phone's data transmit power. The transmit power service is not provided in this context, because transmit power does not vary substantially during a connection. It is noted that it is considered unlikely that phone manufacturers will alter this conventional behavior without providing a mechanism to obtain the transmit power, due to the large number of products in the market that rely upon it. Regardless, if the transit power is varied in a remote device 20, a transfer power service may be implemented to obtain the transmit power being utilized.

The system 100 may experience variations in the transmitter-to-receiver power for a variety of reasons. For instance, variation in power from a transmitter to a receiver in one embodiment is a function of one or more of, but not limited to, the following:
—Heading in attitude coordinates (heading, pitch, roll), measured at the transmitter, of the line going toward the receiver. This is due primarily to antenna gain pattern and polarization pattern.
—Heading in heading coordinates (heading, pitch, roll), measured at the receiver, going toward the transmitter. This is also due primarily to antenna gain pattern and polarization pattern.
—Frequency variation in antenna gain at the transmitter and at the receiver.
—Attenuation due to objects that are in the path between the devices.
—Attenuation due to objects that are in the near field of the antenna (e.g., hands, purses, etc.) that detune the antenna.
—Objects that reflect and channel power (e.g., nearby walls, ceilings, cars, etc.). Some of these objects may move (e.g., car doors, garage doors, etc.).
—Fast fading, or spikes, at specific frequencies at specific narrow locations due to reflections off objects causing destructive, or constructive, interference, respectively.
—Diffraction as RF bends around objects.

Figure 5:
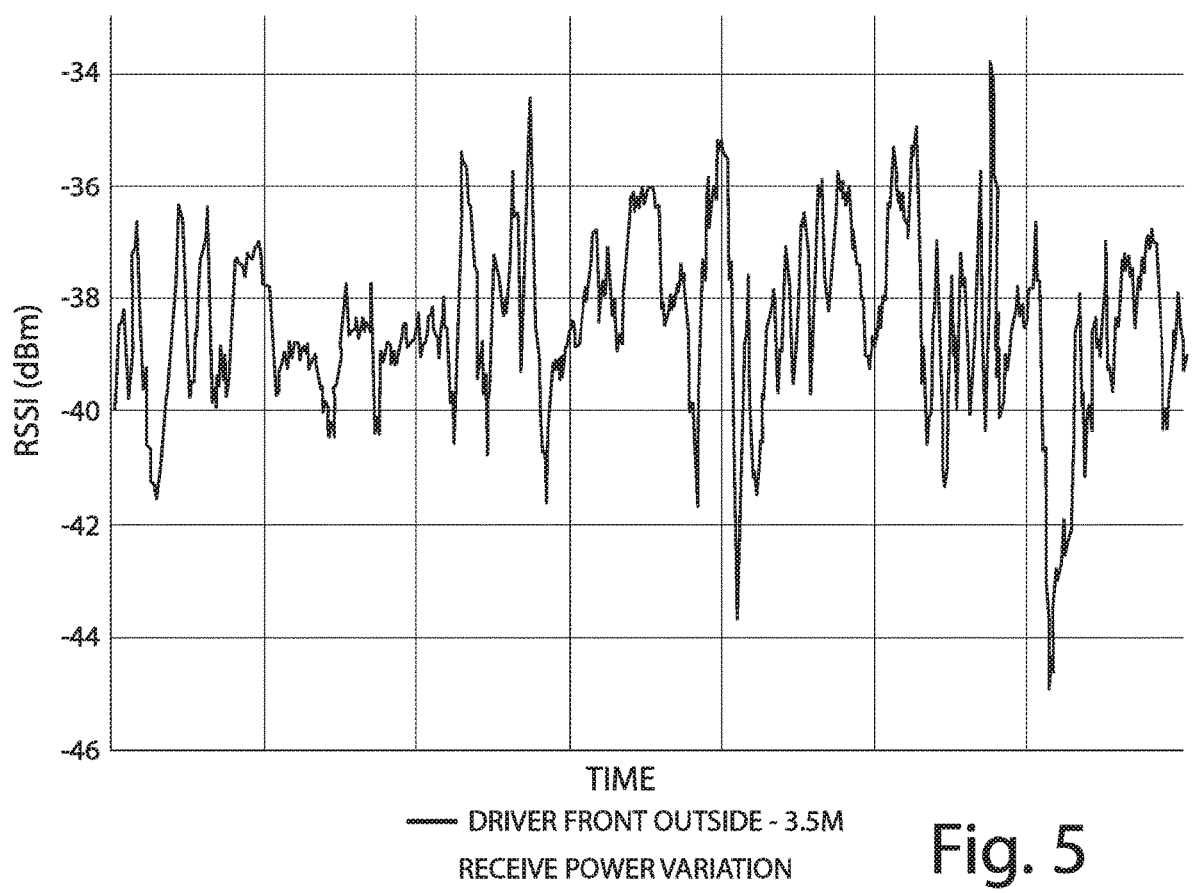
FIG. 5 depicts receive power variation in accordance with one embodiment.

The illustrated embodiment of FIG. 5 depicts receive power variation as observed by RSSI measurements across thirty-seven BLE data channels between a fixed position transmitter (iPhone 6S) and receiver (vehicle sensor) for a period of approximately twelve minutes. This empirical test was conducted in a test environment and was considered to be as controlled as possible.

As described herein, the signal strength (RSSI) at the receiver is dependent upon the orientation of the transmitter (e.g., the remote device 20) relative to an antenna of the receiver (e.g., the object device 50 or the sensor 40, or both). The orientation may vary in angle and polarization relative to the antenna of the receiver in addition to its distance, and attenuators/reflectors in and around the antenna (e.g., a vehicle shell, materials nearby to the antenna [including its ground plane and wiring], etc.). In other words, while it is possible to determine the RSSI for a transmitter in a particular orientation and distance relative to a well-known antenna external from the vehicle (e.g., on a sensor module in a controlled setting), the characteristics of each antenna may be altered by packaging, location, and orientation of the antenna in the vehicle or other type of object.

In a vehicle, there may be many antennas in accordance with one embodiment of the system 100, where each of the antennas may be in a different location with a different orientation. All or a subset of the antennas and associated devices, such as the object device 50 or the sensor 40, may obtain RSSI measurements simultaneously.

Because a variety of factors can affect one or more signal characteristics of communications between the receiver and transmitter, to facilitate tuning the reference locator 210 and the locator algorithm 212, samples may be obtained for the one or more signal characteristics under a variety of conditions.

Example variations in conditions can include purposefully rotating the remote device 20 in all directions, as well as obtaining test samples at different heights to ground, to force testing or obtaining samples to cover a large percentage of all possible angles/orientations.

In one embodiment, the reference locator 210 may be tuned such that one or more inputs from each sensor 40 of the system 100 may be associated with an offset for the reference device 200, or for each type of remote device 20 (e.g., each type of phone, at the cost of maintaining offsets for each type of phone). In one embodiment, because antenna performance may vary by frequency (channel), the system 100 may include a reference model (e.g., a reference locator 210) with an offset for each sensor 40 at each frequency with each type of remote device 20. For purposes of disclosure, however, an offset described herein is a global offset, but it should be understood the present disclosure is not so limited and that several offsets or tuning parameters may be utilized in conjunction with inputs obtained from the parts of the system 100, such as one or more sensors 40 and obtained under various circumstances, such as at different reception or transmission frequencies.

In one embodiment, different types of remote devices 20 may have different antenna radiation properties due to its antenna design(s), antenna gain(s), remote device construction(s), antenna placement(s), and whether or not a user is holding the remote device 20 (and where the user is holding the remote device). Given the variations in and number of possible conditions, including the possible changes in these conditions in real time, an offset or tuning parameter is used in one embodiment as an approximation. Alternatively, testing may be conducted with all or a subset of conditions and additional parameters may be utilized to tune the reference locator 210 accordingly. In the illustrated embodiment, the offset or tuning parameter represents an approximation and may be considered an average across orientations, placement, and other conditions. These test conditions may be conducted in a repeatable manner so that samples may be obtained for the same conditions for each type of remote device 20, including the reference device 200.

Due to the variety of conditions and possible variations in real time, as well as the complexities of radio communication at high frequencies, such as 2.4 GHz for BLE, a user 60 is unlikely to be able to tune a locator algorithm, such as the locator algorithm 212 of the system 100, to operate with their remote device 20 to yield accurate and repeatable results. A user 60 in the field is unlikely to be positioned to control a test environment. As a result, the reference locator 210 may be trained or tuned in a controlled setting and then later provided to the object device 50 or remote device 20 of the user, or both, for use in the field. As discussed herein, a locator may be tuned for the locator function or locator algorithm for each type of remote device 20, or alternatively, an adapter locator 310 may be tuned for each type of remote device 20 in conjunction with a reference locator 210 for a reference type of remote device 20 or reference device 200.

A method in accordance with one embodiment of the present disclosure may involve obtaining test samples and truth information with respect to a reference device 200 and the system 100, including an object device 50 and a plurality of sensors 40. Each of the sensors 40 may measure one or more signal characteristics of communications between the object device 50 and the reference device 200 to form a plurality of test samples. Additionally, the method may involve obtaining truth information for each test sample. The truth information may include an actual location of the reference device 200 relative to the object 10 or other information, such as a zone information, environment, or orientation, or another parameter as discussed herein, or a combination thereof.

The determination of one or more specific values (i.e., RSSI offsets, variability indicators, etc.) or samples for the reference device 200 (also described as the "golden device") may be conducted in a repeatable, controlled manner. This may facilitate calibrating the "golden device" or use with an object 10, such as a type of vehicle.

When the reference locator 210 is calibrated or trained for a vehicle using the "golden device" (the "vehicle calibration"), the calibration of the reference locator 210 may be tested using a procedure and scored—i.e., the reference locator 210 after training may be validated to determine it operates to yield one or more outputs substantially similar to the truth data under a variety of conditions within an separable degree of confidence. If the score is determined to be inadequate during validation, training or calibration of the reference locator 210 may be updated until the reference locator 210 is acceptably scored. Given this framework, the method in one embodiment may be conducted in a manner:

a) That the vehicle calibration test environment is controlled in some way;
b) That the vehicle calibration test procedure is repeatable; and
c) That a scoring system or validation system exists for the vehicle calibration test results.

With regard to (a), in the illustrated embodiment, it is not necessary for the test environment to be a vacuum, rather, the test environment may be configured to be consistent for each procedure that is executed (e.g., an open field, in a particular lab, in a parking lot in a particular configuration, etc.) to yield one or more samples.

With regard to (b), repeatable in this sense means not just the steps, but also in the way the steps are performed and the positions and orientations in which the device is held. Humans have a tendency to introduce variation in these conditions, even in a simple back-to-back test where the intention is to hold the phone in a static location and orientation, let alone across the spectrum of positions used to test an entire vehicle, in tests that are performed days or weeks apart. For this reason, the test conditions may be recorded and implemented in conjunction with a fixture to facilitate repeatability.

With regard to (c), the scoring system or validation system may be configured for objective results, as opposed to subjective results. An example of such an objective scoring system includes a combination of the percentage of correct classifications and various other metrics (e.g., response time/latency, data stabilization time, etc.).

It should be noted that it may be possible for the reference locator 210 to learn and dynamically adjust for some environmental characteristics; in which case, environments that may be dynamically compensated for may not be controlled. For instance, the environment may not be controlled, such as having little control over whether a device is calibrated in a field or a garage or another possibly highly reflective environment. However, the reference locator 210 and/or adapter locator may be configured to adjust for such variability in the environment to facilitate tuning.

A. Obtaining Sample Data and Truth Data

Figure 7:
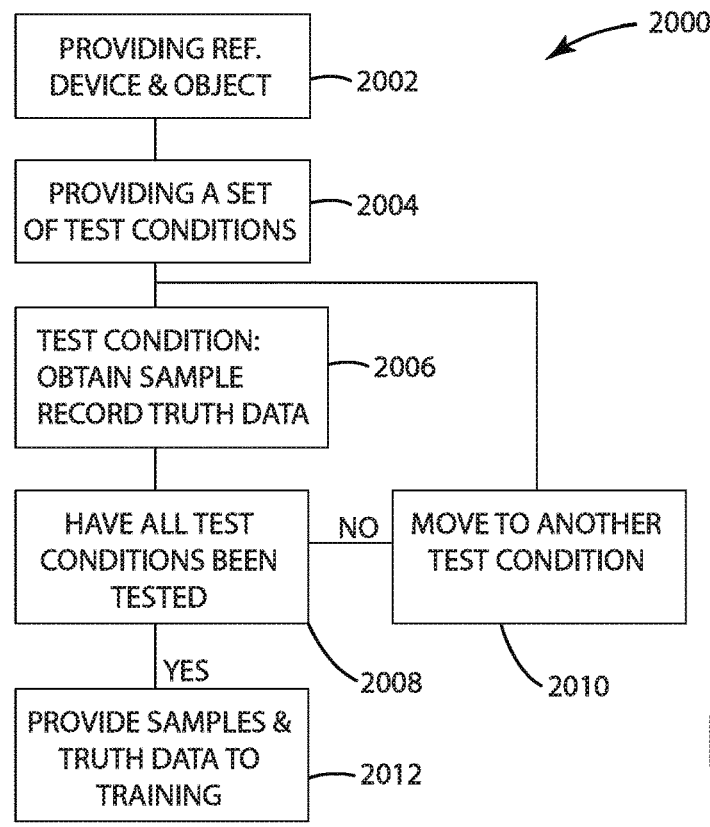
FIG. 7 depicts the method of obtaining a training data set in accordance with one embodiment.

A method 2000 of obtaining samples and truth data (b) for training the reference locator 210 is shown in accordance with one embodiment in FIG. 7. The method 2000 may vary from application to application (e.g., for objects being vehicles vs. a building)—however, the method involves obtaining samples of the one or more signal characteristics under a variety of conditions, including, for example, different positions and orientations with respect to the object or various placements of the remote device 20. In one embodiment, coverage of possible conditions may be determined based on use scenarios and whether a use scenario affects the one or more signal characteristics in a meaningful way different from other use scenarios that are tested. As an example, a use scenario in which the remote device 20 is placed in a first type of handbag may be substantially the same as the use scenario in which the remote device 20 is placed in a second type of handbag, which is provided for testing in the method 2000. As a result, the use scenario with the first type of handbag may not be tested.

In one embodiment, the test procedure (b) or the method 2000 may be adapted to test all or substantially all use scenarios identified as being of interest for the method 2000. It should be understood that the present disclosure is not limited to testing all or substantially all use scenarios—a subset of use scenarios may be tested for training the reference locator 210. In the case where the object 10 is a vehicle, the test procedure may be provided to cover a reasonable number of positions in all or substantially all zones, with the remote device 20 in all orientations and placements (hand, front pocket, back pocket, backpack, purse, etc.).

In the illustrated embodiment, the method 2000 may include providing a reference device 200 and the object 10. As discussed herein, the object 10 used in the method 2000 may be a type of reference object representative of the type of object 10 for which the reference locator 210 is trained. Step 2002. The method 2000 may include providing a set of test conditions under which the reference device 200 and the object 10 can be tested. Step 2004. An example set of test conditions includes the following:

Test locations:
1) 15 m×15 m grid with 1 m spacing with the object 10 centered in the grid;
2) 3 m×3 m grid with 10 cm spacing with the object 10 centered in the grid; and
3) Object interior grid with 10 cm spacing At each test location, positioning the reference device 200 with the following height conditions: a) low height (e.g., 0.5 m), b) middle height (e.g., 1.0 m), and c) high height (e.g., 1.5 m). The low, medium and high height conditions may vary depending on the circumstances. For instance, outside the object, such as in the case of the vehicle, the example heights correspond to likely low, medium, and high height conditions. Inside the vehicle, the low, medium, and high height conditions may be different due to the space constraints of the vehicle cabin.

At each test location and height condition, the reference device 200 may be disposed in a plurality of orientations. The plurality of orientations may relate to variations in pitch, roll, or heading, or a combination thereof.

Figure 8:
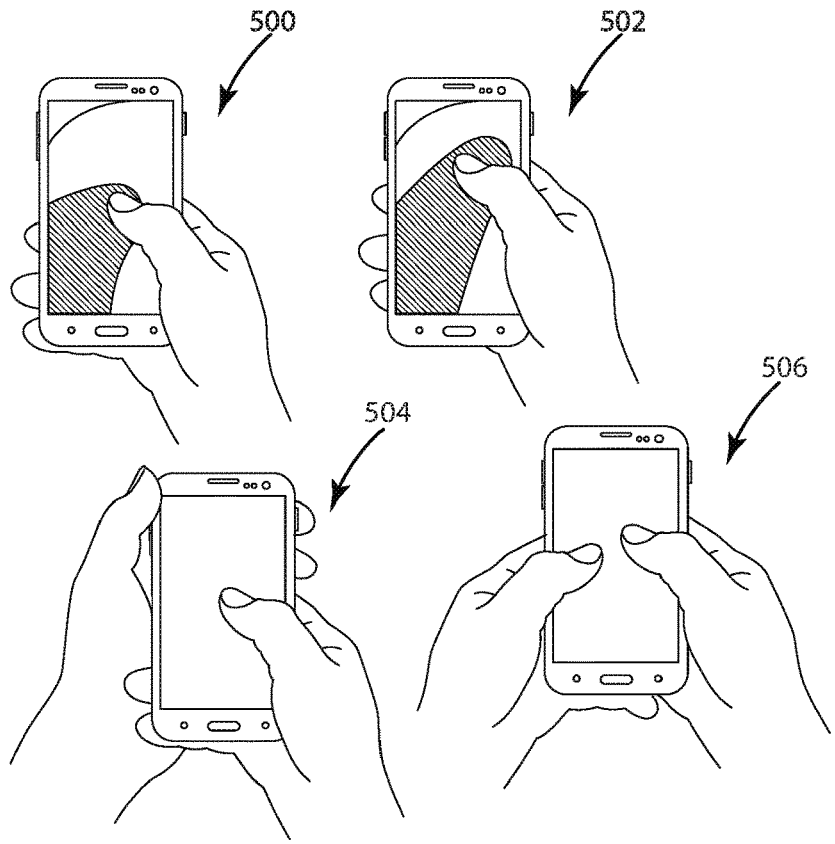
FIG. 8 shows a variety of grip positions for holding a portable device in accordance with one embodiment.

At each test location, height condition and orientation placement of the reference device 200 may be varied. Placement may generally relate to the type of holder that is carrying the reference device 200 and how the holder is carrying the reference device 200. To provide examples, if the type of holder is a human hand, the reference device 200 may be held in a normal gripping position, shown in the illustrated embodiment of FIG. 8 and designated 500. The gripping position may be varied based on usage statistics for the type of reference device 200. Examples of other gripping positions are also shown in the illustrated embodiment of FIG. 8, including raised gripping position 502 (which is a variant of the normal gripping position), a two-handed gripping position 504 and a variant thereof designated 506. Examples of other holders for the reference device 200 include a front pocket, a back pocket, a backpack, or a purse, or a combination thereof.

Under each condition, the reference device 200 may be held in place for a period of time such as 10 to 30 seconds. During this time, the system 100 may be configured to obtain a plurality of samples with respect to the one or more signal characteristics described herein. For instance, the object device 50 or the sensor 40, or both, may sense one or more characteristics of communications with the reference device 200 under each condition. Example characteristics include signal strength (e.g., RSSI), TOF, and AOA. Steps 2006, 2008, 2010.

It should be noted that the test environment or the conditions set may vary depending on the application. A test procedure that captures substantially all of the conditions identified above may be considered comprehensive for a particular type of reference device 200 and object 10. It should be noted that one or more of the identified conditions may be dropped from the conditions set or performed in alternate test procedures or alternative embodiments. The conditions identified for the method 2000 or the test procedure may be selected to capture the performance of the system in a reasonable number of use cases or conditions. Additionally, method 2000 or the test procedure may be used to collect data (as described herein). The collected data may or may not be combined or stored in aggregate, although doing so may facilitate correlation of the collected data among the plurality of test conditions for the reference device 200 and the object 10. The collected data may be provided to a training module of a controller in accordance with one embodiment. Step 2012.

Given the same or similar subsets of the above set of test points, trained testers may have significant difficulty in the conditions outlined above in a repeatable, consistent manner (note that with human testers, their bodies will be in the system [which may or may not be acceptable]). Compensating for accommodating such variability in the reference locator 210 and accuracy thereof may be built into the training process. For this reason, an end-user (untrained tester) may be unsatisfied with the results of training for a given set of conditions. This is particularly acute in the realm of 2.4 GHz RF, where environmental conditions can have a significant impact on the one or more sense characteristics of communications.

In an alternative embodiment, the test procedure or method 2000 may be performed autonomously, so that all or substantially all data points may be captured consistently.

The example conditions outlined above are generally static conditions where the reference device 200 is positioned and held still for a period of time. It should be noted that the present disclosure is not so limited. Additionally, or alternatively, the conditions used in the method 2000 or the test procedure may be functional tests in which circumstances may be dynamic. Examples of such functional tests include approaches, departures, and zone transitions, or combinations thereof.

III. Adapter Locator Training

The system 100 in accordance with one embodiment may be configured to tune in adapter locator 310 for determining location with respect to a type of device 20, described herein for purposes of disclosure as a tester device 300. The type of the tester device 300 may be different from the type of the reference device 200 used in conjunction with training the reference locator 210. As discussed herein, the adapter locator 310 may be trained in conjunction with the tester device 300 to potentially avoid training a reference locator 210 for each type of device 20. In other words, the reference locator 210 may be trained in conjunction with the reference device 200, and the adapter locator 310 may be trained in conjunction with a trained version of the reference locator 210 and the tester device 300. For purposes of disclosure, as discussed herein, the tester device and reference device are types of the remote device 20 described herein and are designated respectively by reference numbers 200, 300 in the illustrated embodiments in conjunction with the remote device 20.

The method of obtaining sample data and truth data for the tester device 300 may be substantially the same as the method utilized for obtaining sample data entries data for the reference device 200. For instance, samples may be obtained with respect to the tester device 300 under the same set of conditions utilized for the reference device 200. Alternatively, samples may be obtained for the tester device 300 using a subset of the conditions utilized for the reference device 200 and training the reference locator 210. For instance, the adapter locator 310 may be trained using a less comprehensive set of training data (samples and truth data) than the training data utilized for training the reference locator 210. The complexity of the process or method 2000 obtaining the training data may be significantly reduced for training the adapter locator 310, thereby facilitating reducing the amount of time used to obtain training data for a plurality of tester devices 300 of varying types, and potentially for obtaining training data in conjunction with a plurality of types of objects 10 different from the one used in conjunction with training the reference locator 210, or a combination thereof.

Figure 9:
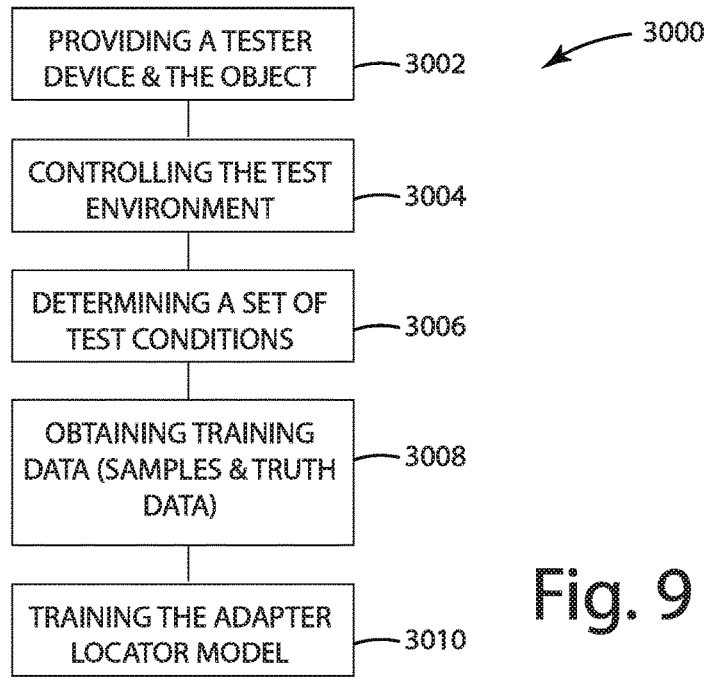
FIG. 9 depicts a method of training an adapter locator in accordance with one embodiment.

In the illustrated embodiment of FIG. 9, a method of training the adapter locator 310 is shown and generally designated 3000. The method 3000 may include obtaining training data with respect to the tester device 300 and the object 10, similar to the method 2000. In one embodiment, the method 3000 may include determining an offset parameter or value for each type of tester device 300 relative to the reference device 200 (the "golden device"). The process of obtaining training data for the tester device 300 may be conducted in the same or substantially the same environment as the reference device 200 so that the sampling process for the training data is consistent with that used for the reference device 200. The training data obtained for the tester device 300 may be tested and scored using the same or substantially the same procedure as the testing and scoring procedure used for the reference device 200 to ensure that a) the tester device 300 performs well with the system or b) the adapter locator 300 performs substantially the same or similar to the reference locator 200.

In one embodiment, the method 3000 may involve controlling the test environment for the tester device 300 and the object 10 and doing so in a way that is substantially the same as the test environment for the reference device 200. Steps 3002, 3004. The method 3000 may also involve establishing that the set of conditions for obtaining samples for the tester device 300 and the object 10 is repeatable, and optionally the same as those conditions used for the reference device 200. Step 3006. With the set of conditions established and the tester device 300 and object 10 being provided, training data for the adapter locator 310 may be obtained. The training data in one embodiment may include a plurality of samples corresponding to one or more sensed characteristics of communication between the tester device 300 and the object device 50 or sensor device, or both, as well as truth information with respect to one or more characteristics of the tester device 300 (e.g., location, height, orientation, and placement). Step 3008.

The method 3000 may include the process of training the adapter locator 310 based on the training data obtained with respect to the tester device 300 and the object 10. The training process may be substantially similar to the method described in conjunction with the reference locator 200, but with several exceptions. For instance, the adapter locator 310 may be trained to affect input or output of the reference locator 210, or to affect one or more parameters of the reference locator 210, or any combination thereof.

Figure 10:
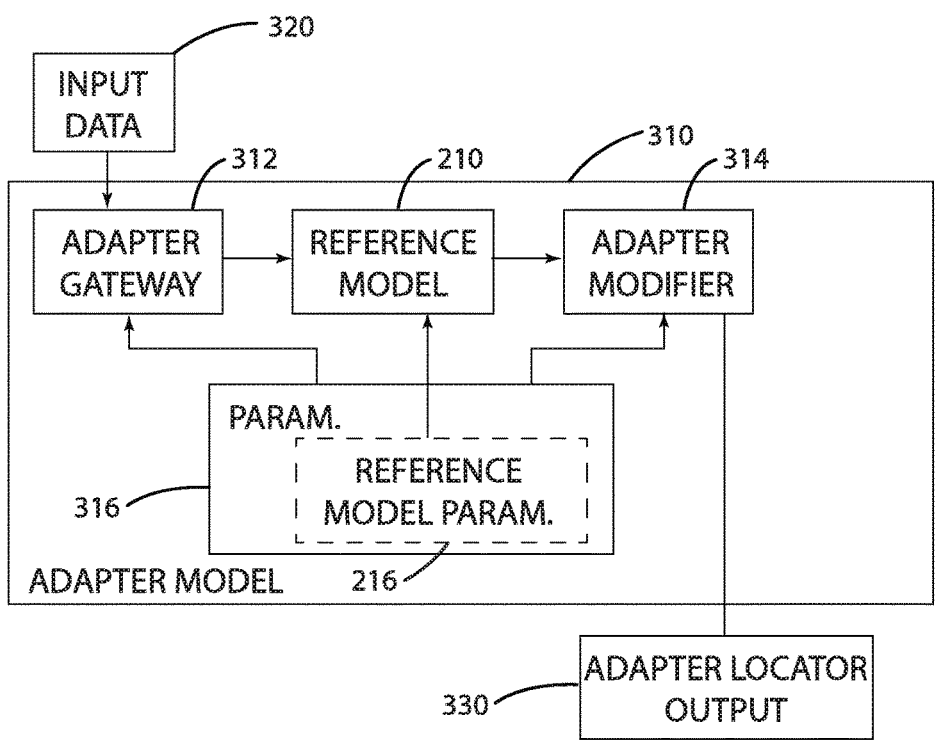
FIG. 10 depicts the adapter locator in accordance with one embodiment.

An adapter locator 310 in accordance with one embodiment is shown FIG. 10. The adapter locator 310 may be configured to receive input data 320, such as one or more signal characteristics of communications between a remote device 20 and the object device 50 or the sensor 40, or a combination thereof. The input data 320 may be substantially similar to the type of data collected in the samples during training of the adapter locator 310 and the reference locator 210. The adapter locator 310 may be configured to provide adapter locator output 330 indicative of a location of the remote device 20 relative to the object 10 on which the object device 50 and/or the sensor 40 are disposed in a fixed relationship.

In one embodiment, the adapter locator 310 may include a parameter configuration 316 stored in memory. The parameter configuration 316 may include one or more parameters that are adjusted during training of the adapter locator 310 in accordance with the plurality of samples and related truth data. As discussed herein, the one or more parameters of the adapter locator 310 may be adjusted in accordance with the gradient descent optimization algorithm for maximizing a score of the adapter locator 310 so that the adapter locator output 330 aligns with the truth data within a degree of confidence.

Optionally, at least one parameter of the parameter configuration 316 may correspond to at least one of the parameters 214 of the reference locator 210, as shown in phantom lines in FIG. 10. For instance, the reference locator 210 may be trained in conjunction with a first parameter, and the adapter locator 310 may be trained in conjunction with adjustment to the first parameter of the reference locator 210. In one embodiment, this first parameter of the reference locator 210 may be kept static during training of the reference locator 210, and may be adjusted during training of the adapter locator 310. For instance, the first parameter of the reference locator 210 may be a global offset value of signal strengths of communications with respect to the remote device 20, and the reference locator 210 may be trained such that the global offset value is substantially zero for the reference device 200. During training of the adapter locator 310 for the tester device 300, the global offset value may be adjusted to achieve a score for the adapter locator 310 that is considered acceptable or to achieve an adapter locator output 330 that performs within a threshold degree of confidence.

It is noted that the number of parameters controlled by the adapter locator 310 (e.g., the number of training parameters) may be significantly less than the number of parameters utilized in training the reference locator 210. As a result, it is possible that the adapter locator 310 may be performing in some circumstances substantially similar to the reference locator 210 but not similar in other circumstances. The training process may be configured to provide greater weight toward achieving performance for circumstances considered more influential to achieving an acceptable system 100 as a whole greater relative to circumstances considered less influential. For instance, accuracy at large distances may be weighed less than accuracy in close range to the object 10.

Optionally, the adapter locator 310 may include one or more of the following: an adapter gateway 312 configured to modify or adapt the input data 320 provided to the reference locator 210, and an adapter modifier 314 configured to modify or adapt the output received from the reference locator 210. The parameter configuration 316 stored in memory and associated with the adapter locator 310 may include one or more parameters associated with the adapter gateway 312 and the adapter modifier 314. Training of the adapter locator 310 may include adjusting the one or more parameters to achieve a performance score for the adapter locator 310 relative to the truth data for the tester device 300. The adapter gateway 312 may perform signal processing and/or data aggregation on the sensor data received by the adapter locator 310. Parameters may affect this signal processing and/or data aggregation. The adapter modifier 314 may be a post processor configured to affect an output of a locator, such as the reference locator 210 or the adapter locator 310. The adapter gateway 312 and/or the adapter modifier 314 may be integral to the locator or absent therefrom.

Returning to the method 3000 and the illustrated embodiment of FIG. 9, the method 3000 may also involve training the adapter locator 310 and providing a scoring function during training the adapter locator 310 that is substantially the same as the scoring function used for training the reference locator 210 in conjunction with the reference device 200. Step 3010. This way, the score of the adapter locator 310 can be compared in a meaningful way against the score of the reference locator 210. In other words, in one embodiment, for the method 3000 to achieve a performant system in conjunction with the tester device 300, each tester device 300 may be tested and scored in the same way as the reference device 200 (e.g., in the case of a vehicle, in the same way as the vehicle calibration with the reference device 200). In one embodiment, minimally, each tester device 300 may be tested and scored in the same way as other tester devices 300 are tested and scored, potentially in a manner different from the test and scoring of the reference device 200.

Similar to the vehicle calibration test procedure or the method 2000 described above as being repeatable, the device calibration test or method 3000 may be configured to include a plurality of test conditions that involve use scenarios identified as affecting or being indicative of a location of the tester device 300 based on RF communication. In one embodiment, the test conditions may be substantially exhaustive of all scenarios; however, the present disclosure is not so limited. An alternative embodiment may include providing a test device calibration environment(s), a test procedure(s), and a scoring mechanism(s), or combinations thereof, that is/are different from the vehicle calibration environment(s), test procedure(s), and scoring mechanism(s) utilized in conjunction with the method 2000. In this case, one-to-one correspondence may not exist between the score of the test device 300 and the adapter locator 310 to assess device-to-"golden device" (device-to-vehicle calibration) performance. For example, the device calibration test procedure or the method 3000 may be established in such a way that only a subset of the vehicle calibration test procedure is performed; in this case, it may be unknown whether the test device 300 performs similarly in scenarios where the "golden device" or reference device 200 was tested, but the test device 300 was not. Similarly, the device calibration test procedure or method 3000 may include scenarios not performed during the vehicle calibration test procedure or method 2000; in this case, it is unknown whether the "golden device" or reference device 200 performs similarly in scenarios where the test device 300 was tested, but the "golden device" or reference device 200 was not. In either case, comparing device-to-device calibration performance is feasible, given that the method 3000 is conducted in a controlled, repeatable manner and with a scoring function.

In one embodiment, a different device calibration test procedure or method 3000 is established to additionally test the reference device 200 or the "golden device" using the established method 3000 (the device calibration test procedure). In one embodiment, having separate environments, procedures, and/or scoring mechanisms or functions may produce additional work, data to maintain and propagate, and performance variations relative to the "golden device".

Figures 11, 12:
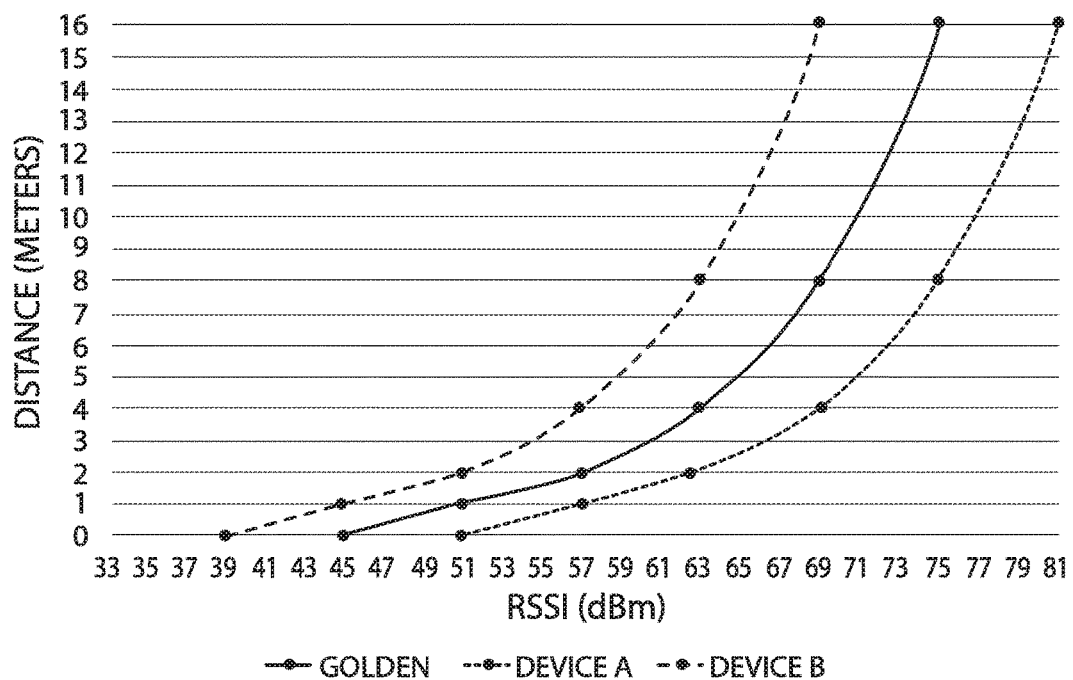
FIG. 11 shows actual versus computed distance for a variety of devices in accordance with one embodiment.
FIG. 12 shows a plot according to the data in FIG. 11.

The adapter locator 310, as trained, in accordance with one embodiment may affect the system 100 to determine location information within the degree of confidence for a plurality of types of remote devices 20. The adapter locator 310, as trained, in one embodiment may facilitate offsetting a signal strength characteristic of communications with a remote device 20 similar in type to the tester device 300 and relative to a signal strength of communications with the reference device 200. The illustrated embodiments of FIGS. 11 and 12 show a table and a plot of values for the reference device 20 and two types of remote devices 20 that are different in type than the reference device 20.

In the illustrated embodiment, a device calibration offset or offset parameter for a particular type of remote device 20 (e.g., a phone) may translate its RSSI measurements (or signal strength characteristic measurement conducted with respect to communication with the remote device 20) for use with the reference locator 210 trained for use with the reference device 200, including an object calibration for the reference device 200 with the locator function and associated parameters. The adapter locator 310 may be trained to achieve a similar performance with each device as compared to the reference device 200. As described herein, an incorrect (or missing) calibration offset may result in variations in determined distance and/or zone.

Figure 14:
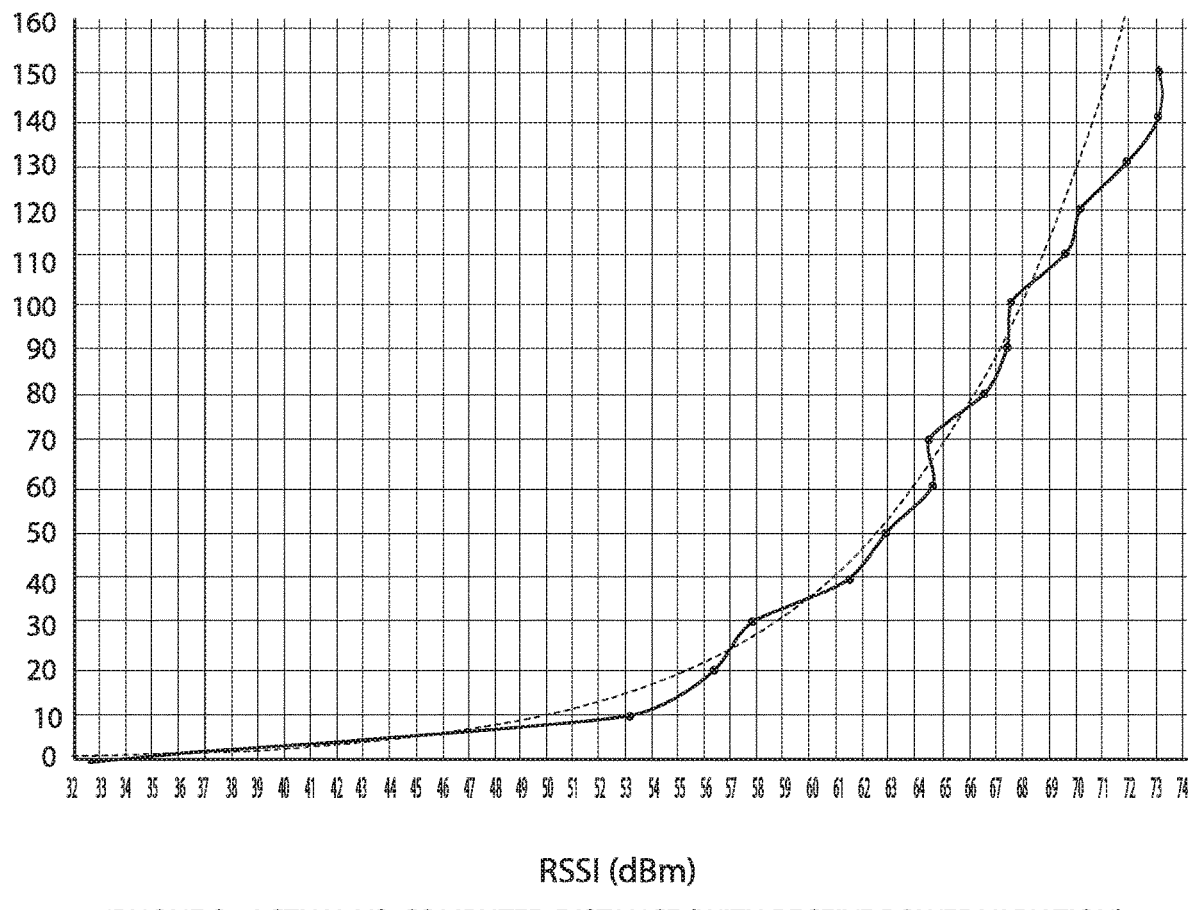
FIG. 14 shows a plot of the data in FIG. 13.

The signal strength characteristic measurements depicted in the illustrated embodiments of FIGS. 13 and 14 show plurality of measurements obtained at different distances in an outside environment with respect to a type of object 10 that is the vehicle. As shown, with respect to the reference device 200, every 6 dBm decrease in RSSI corresponds to a doubling of distance (assuming all other factors, such as those described above, remain constant [which is unlikely, particularly as distance increases]). The actual RSSI-to-distance relationship may vary from the relationship shown in the illustrated embodiment, based upon the environment and can vary from as low as 3 dBm decrease per doubling of distance to a 12 dBm or more decrease per doubling of distance. For this reason, the measurements shown in the illustrated embodiment are provided for purposes of discussion, and it should be understood that the actual profile or relationship between our RSSI and distance may vary depending on a variety of circumstances including the environment and configuration of one or more of the remote device 20, the object 10, the object device 50, and the sensor 40.

The RSSI values and thresholds shown in the illustrated embodiment are exemplary and may vary in practice. The RSSI values and thresholds depict the effects of different device transmit configurations (e.g., antenna gain, antenna radiation pattern, device construction, etc., as described herein) are theoretical, and thus, do not necessarily reflect values that may be observed, or thresholds that may be used, in real systems installed in vehicles. The RSSI values may vary based on a number of factors, and as discussed herein such as variability and environment.

The table in the illustrated embodiment provides example distance calculation variation between the reference device 200 and two other types of remote devices 20, identified as Device A and Device B. For purposes of disclosure, the differences reflect offsets of −6 for Device A and +6 for Device B. The "computed distances" are the distances computed for the particular device using the reference locator 210, as trained in conjunction with the reference device 200. The data within the table does not include receive power variation effects (such as those described in conjunction with the illustrated embodiment of FIG. 14).

As shown in the illustrated embodiment, although the differences in distance calculation are more significant at further distances, the differences near the vehicle are sufficient to impact the user experience. For example, in a system where an unlock zone is configured to be entered two (2) meters from the vehicle, the reference device 200 would be correctly determined to be within the unlock zone at two (2) meters, whereas Device A would not be determined to be within the unlock zone until it reached one (1) meter and Device B would be determined to be within the unlock zone at four (4) meters.

As described in conjunction with the illustrated embodiment of FIG. 14, there are many factors that may cause RSSI measurements to vary. An example of such variations can be seen in the illustrated embodiment of FIG. 5, which depicts output ("Calibrated iPhone") from a trained adapter locator 310, as described herein as a calibrated distance conversion equation, for an iPhone 6S relative to smoothed and averaged RSSI readings at actual distances ("Measured iPhone") from the iPhone 6S held in a fixed orientation and positioned at chest height in a small, but nearly-empty, parking lot in a downtown setting surrounded by buildings. The RSSI decrease per doubling of distance was measured in this configuration to be approximately 5 dBm. Relative to this configuration, a Galaxy S7 was measured to have an average difference (offset) of −3.5 dBm (not shown). The data in FIG. 14 is provided in the table in FIG. 13.

In the above configuration, the parking lot is the same parking lot in which the reference locator 210, also described as the distance conversion equation, was trained or calibrated. As described herein, the measurements identified in the illustrated embodiment may vary based on different environments (e.g., inside a garage, or even in the same parking lot full of vehicles).

The impact on thresholds is similar to or the same as that of the distance calculation output from the reference locator 210 or the adapter locator 310. For example, the reference locator 210 or the adapter locator 310 may be configured to provide an output indicative of distance or location of a remote device 20 relative to an object 10. Examples of the output include location information, such as a computed distance of the remote device 20 relative to the object 10, or a signal strength that itself may be indicative of location or distance of the remote device 20 relative to the object 10. The system 100 may be configured to implement one or more thresholds with respect to the location information that pertain to one or more zones or positions relative to the object. For instance, the one or more zones may include a region within 2 m of the object 10 and regions within an interior of the object 10 such as a vehicle cabin in the context of the object 10 being a vehicle. Example regions within the interior of the vehicle include a driver-side seat, a passenger side seat, a rear seat of the vehicle, and inside the vehicle interior itself. Presence of the remote device 20 within one or more of these zones or transitioning from one or more zones to another zone may be associated with an action or status with respect to the remote device. For instance, if the remote device 20 transitions from an outer zone considered far from the vehicle to an unlock zone identified as proximal to the vehicle (e.g., within 2 m of the vehicle), the system 100 may be configured to unlock the vehicle.

The system 100 may define an unlock zone, not as a computed distance, but as an RSSI threshold (or set of thresholds). In such a system 100, Device A may not satisfy the thresholds soon enough and Device B may satisfy them too early. For the same reasons, an inside determining threshold may not be satisfied with Device A, unlike the reference device 200 or Device B. It is noted that there are processes to determine and/or restrict relative position (driver/passenger/rear, inside/outside) that are immune to such calibration, and thus, it may still be ensured that the system 100 adequately restricts inside and outside determinations. For example, Device B may satisfy an inside determination threshold while located outside the vehicle, but the system 100 may still not allow an inside determination due to said other mechanisms. The zone may be determined both as a function of the locator output and other states of the object, such as a door being open.

IV. User-based Adapter Training

Although aspects of the present disclosure directed to training the adapter locator 310 are described primarily in conjunction with doing so in a controlled environment using a test or device 300 representative of a type of device provided to a user, the present disclosure is not so limited. The adapter locator 310 may be trained in conjunction with a user's actual remote device 20. The user may be provided a set of conditions and instructions to facilitate executing the method 3000 of training the adapter locator 310. Alternatively, the system 100 may be configured to train the adapter locator 310 based on one or more samples and truth information obtained with respect to actions or events that occur with respect to the object 10. For instance, in the context of a vehicle, if the door is opened, the system 100 may assume that the remote device 20 is in close proximity to the vehicle (e.g., as truth information), and develop an offset or affect parameters by training the adapter locator 310 to facilitate correlation between the one or more signal characteristics obtained at the time the door was opened. Likewise, ignition of the vehicle, or proximity detection of a driver in the vehicle seat, may be used as a basis for determining truth information with respect to the remote device 20 and allow training of the adapter locator 310 based on one or more samples obtained at the same time.

The user may execute the device calibration process or method 3000, where no substantial testing of the resultant calibration or trained adapter locator 310 is performed or analyzed prior to use (such as the case with a user-performed device calibration). In such a case, as described above, the device calibration may be significantly impacted by environmental and test procedure variations.

With such a device calibration approach (i.e a user-performed calibration), the system 100 may be configured to compute the offset, either in real-time or at the end of the test procedure, based on the "golden device" calibration data or reference locator 210, in addition to providing the user interfaces on the user's phone and communications modes to perform said calibration procedure. It should also be noted that with such an approach, millions of users may be duplicating the effort of determining calibrations for remote devices 10. In one embodiment, the calibration data may be provided via a network to a central or distributed database of calibration information, thereby enabling training of an adapter locator 310 or a reference locator 210, or both, using data obtained under a variety of conditions for a variety of remote devices 20 and for a variety of objects 10. In other words, a significant amount of calibration data may be provided by potentially millions of users to the database for analysis and tuning of the reference locator 210 or the adapter locator 310, or both.

The set of conditions provided to the user 60 for performing the method 3000 in the context of a user-performed device calibration process may enable a substantial degree of repeatability or reproducibility and outline a controlled environment for the user. The user may be instructed to perform the method 3000 under one or more of the following conditions:

—Control of the environment —dogs, kids, friends, items, or people within the vehicle, in a garage, in a parking lot, in a field, door state, etc.
—Control of device orientation —deliberately rotate and move the device within prescribed parameters.
—Control of device position —deliberately position the phone through a range of prescribed positions.

A variety of conditions that may be provided to the user 60 for executing the method 3000 or conducting a user-performed device calibration procedure. Provided below are various sets of conditions—it should be understood that the example sets of conditions may vary depending on the application such that one set of conditions may include more or fewer conditions than those outlined. For instance, a condition from one of the example sets may be incorporated into another example set. And, one or more conditions from an example set may be absent. It should also be noted that the example sets of conditions may be conducted in conjunction with each other, such that a first one of the examples that may be performed by the user followed by a second one of the example sets.

The procedures below are listed in order considered least likely to most likely to be successful; earlier procedures may provide results for comparison with later processes (and to determine if a simpler procedure produces acceptable results).

After the user 60 has completed some or all of the below sets of conditions, the method 3000 may involve training an adapter locator 310 specific to the user's remote device 20. In one embodiment, the method 3000 may include computing one or more parameters (e.g., offsets) for one set of conditions that can be compared to one or more parameters computed during training with respect to another set of conditions.

A. User Calibrates Using a Known Antenna Separate from the Vehicle

In one embodiment, the method 3000 may be executed in conjunction with the following set of conditions. This method uses an antenna external from the object 10, such as a vehicle. Variation is obtained by rotating the remote device 20 (phone) in place.

The set of conditions and method 3000 in one embodiment may include the following:

1) Place the antenna in a fixed position in the same location for the following steps.
2) Hold the reference device 200 in a location one meter from the antenna.
3) Rotate the reference device 200 in all directions in said location for 30 seconds. Collect data from this time.
4) Repeat (2) and (3) with test device 300-A under test.
5) Repeat (2) and (3) with test device 300-B under test.
6) Repeat (2) and (3) with test device 300-C under test.
7) Compute min, max, mean, and standard deviation for each data set.
8) Evaluate whether min/max/mean (3) minus min/max/mean (4)/(5)/(6) is an appropriate parameter (e.g., offset) within a degree of confidence.

It is noted that the test devices 300 are provided with separate identifiers A, B, and C in the method described in accordance with one embodiment. These identifiers are provided for purposes of disclosure to differentiate between different test devices 300 used in conjunction with the method 3000 and in accordance with one embodiment.

B. User Places Phone in Center Console

In one embodiment, the method 3000 may use the antennas (such as the antenna array 30 or the one or more antennas provided in the object device 50 or the sensor 40) installed in or on the object 10, such as a vehicle. It is noted that the remote device 20 may not move when placed in the cup holder, but the differing installation orientations of the sensors in the vehicle may provide some variation.

The set of conditions and method 3000 in one embodiment may include the following:

1) Place the reference device 200 in the cup holder.
2) Collect data for 30 seconds.
3) Repeat (1) and (2) with test device 300-A under test.
4) Repeat (1) and (2) with test device 300-B under test.
5) Repeat (1) and (2) with test device 300-C under test.
6) Compute min, max, mean, and standard deviation across all antennas for each data set.
7) Evaluate whether min/max/mean (2) minus min/max/mean (3)/(4)/(5) is an acceptable parameter (e.g., an offset) within a degree of confidence.

C. User Rotates Phone near One or Two Sensors

In one embodiment, the method 3000 may use one or two antennas installed in the object 10, such as a vehicle. Variation may be obtained by rotating the remote device 20 in place.

The set of conditions and method 3000 in one embodiment may include the following:

1) Hold the reference device 200 in a location one meter from the antenna (equidistant between antennas, if multiple antennas are present) (e.g., on the outside of the driver side of the vehicle, one meter from center sensor in vehicle).
2) Rotate the reference device 200 in all directions in said location for 30 seconds. Collect data from this time.
3) Repeat (1) and (2) with test device 300-A under test.
4) Repeat (1) and (2) with test device 300-B under test.
5) Repeat (1) and (2) with test device 300-C under test.
6) Compute min, max, mean, and standard deviation across all applicable antennas (one/two) for each data set.
7) Evaluate whether min/max/mean (2) minus min/max/mean (3)/(4)/(5) is an acceptable parameter (e.g., an offset) within a degree of confidence.

D. User Walks Around Vehicle in Circle

In one embodiment, the method 3000 may use all antennas installed in the vehicle. Variation may be obtained by rotating the phone while walking around the vehicle.

The set of conditions and method 3000 in one embodiment may include the following:

1) Hold the reference device 200 at waist level.
2) Rotate the reference device 200 in all directions in said location while walking around the vehicle at one meter from the vehicle for nine (9) passes. Collect data from this time.
3) Repeat (1) and (2) with test device 300-A under test.
4) Repeat (1) and (2) with test device 300-B under test.
5) Repeat (1) and (2) with test device 300-C under test.
6) Compute min, max, mean, and standard deviation across all antennas for each data set.
7) Evaluate whether min/max/mean (2) minus min/max/mean (3)/(4)/(5) is an appropriate parameter (e.g., an offset) within a degree of confidence.

E. User Walks Around Vehicle in Circle at Varying Heights

In one embodiment, the method 3000 may use all antennas installed in the vehicle. Variation is obtained by rotating the phone while walking around the vehicle.

The set of conditions and method 3000 in one embodiment may include the following:

1) Hold the reference device 200 at arm length near leg level.
2) Rotate the reference device 200 in all directions in said location while walking around the vehicle at one meter from the vehicle for three (3) passes. Collect data from this time.
3) Hold the reference device 200 at waist level.
4) Rotate the reference device 200 in all directions in said location while walking around the vehicle at one meter from the vehicle for three (3) passes. Collect data from this time.
5) Hold the reference device 200 at call (ear) level.

6) Rotate the reference device 200 in all directions in said location while walking around the vehicle at one meter from the vehicle for three (3) passes. Collect data from this time.
7) Repeat (1) through (6) with test device 300-A under test.
8) Repeat (1) through (6) with test device 300-B under test.
9) Repeat (1) through (6) with test device 300-C under test.
10) Compute min, max, mean, and standard deviation across all antennas for each data set.
11) Evaluate whether min/max/mean (2)/(4)/(6) minus min/max/mean (7)/(8)/(9) is an appropriate parameter (e.g., an offset) within a degree of confidence.

F. User Walks Around Vehicle in Circle and Sits in Each Seat

In one embodiment, the method 3000 may use all antennas installed in the vehicle. Variation is obtained by rotating the phone while walking around and sitting in the vehicle.

The set of conditions and method 3000 in one embodiment may include the following:
1) Hold the reference device 200 at waist level.
2) Rotate the reference device 200 in all directions in said location while walking around the vehicle at one meter from the vehicle for nine (9) passes. Collect data from this time.
3) Rotate the reference device 200 in all directions in said location while sitting in each passenger seat for 30 seconds. Collect data from this time.
4) Repeat (1) through (3) with test device 300-A under test.
5) Repeat (1) through (3) with test device 300-B under test.
6) Repeat (1) through (3) with test device 300-C under test.
7) Compute min, max, mean, and standard deviation across all antennas for each data set.
8) Evaluate whether min/max/mean (2)/(3)—min/max/mean (4)/(5)/(6) is an appropriate parameter (e.g., an offset) within a degree of confidence.

G. User Walks Around Vehicle in Circle at Varying Heights and Sits in Each Seat

In one embodiment, the method 3000 may be a combination of the processes outlined in Section F and G. The method in this embodiment may use all antennas installed in the vehicle. Variation may be obtained by rotating the phone while walking around and sitting in the vehicle.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A system for determining location information pertaining to a location of a portable device relative to an object, said system comprising:
   an object device disposed in a fixed position relative to the object, said object device having an antenna configured to communicate wirelessly with the portable device via a communication link;
   a controller configured to determine location information about the portable device relative to the object;
   said controller including an adapter locator configured to store a device-type parameter associated with a signal characteristic of communications between the portable device and said antenna, wherein said device-type parameter corresponds to a device-type of the portable device;
   said controller including a reference locator coupled to said adapter locator, said reference locator configured to obtain from memory one or more reference parameters operable to facilitate determining location information based on a signal characteristic of communications wirelessly transmitted between a reference device and said object device, wherein said adapter locator is configured to affect an output of the reference locator based on the device-type parameter; and
   wherein said controller is configured to obtain said device-type parameter corresponding to the device-type of the portable device, said controller configured to determine location information with respect to the portable device relative to the object based on output from said adapter locator and said signal characteristic of communications wirelessly transmitted between the portable device and said object device.

2. The system of claim 1 wherein said system is separate from the portable device and disposed on a vehicle.

3. The system of claim 1 wherein said signal characteristic is a signal strength of communications from the portable device to said antenna of said object device.

4. The system of claim 3 wherein said reference locator is operable to provide an output based on input of the device-type parameter and said signal strength of communications, wherein said output is indicative of a location of the portable device, wherein said controller is configured to determine said location information based on said output.

5. The system of claim 1 wherein said communication link is a primary communication link, and wherein said system comprises an object sensor device configured to monitor a signal characteristic of communications between the portable device and said object device, wherein said object sensor device is configured to communicate signal information indicative of the monitored signal characteristic to said object device via an auxiliary communications link separate from said primary communication link.

6. The system of claim 1 wherein:
said communication link is a primary communication link;
said system comprises an object sensor device operable to establish a secondary communication link with the portable device;
said object sensor device is capable of sniffing communications that occur with respect to said primary communication link; and
said object sensor device is configured to communicate said controller a first signal characteristic of communications that occur with respect said primary communication link and a second signal characteristic of communications that occur via said secondary communication link.

7. The system of claim 6 wherein said primary communication link is BLE, and said secondary communication link is UWB, wherein said first signal characteristic is signal strength, wherein said second signal characteristic is time-of-flight.

8. The system of claim 5 comprising a plurality of said object sensor devices, wherein each of said object sensor devices is disposed in a fixed position relative to the object.

9. The system of claim 5 wherein:
said device-type parameter is a first device-type parameter;
said controller is configured to store a second device-type parameter associated with said signal characteristic of communications monitored by said object sensor device; and
said reference locator is configured to determine location information based on said signal characteristic of communications monitored by said object sensor device and said second device-type parameter.

10. The system of claim 9 wherein said reference locator is calibrated to provide output indicative of a location of the portable device relative to the object, wherein said reference locator is calibrated based on a plurality of calibration samples for communications with the reference device obtained with respect to a plurality of positions of the reference device relative to the object.

11. The system of claim 1 wherein said reference locator is operable to translate said signal characteristic of communications wirelessly transmitted between the portable device and said object device to a corresponding signal characteristic for the reference device based on said device-type parameter.

12. The system of claim 1 wherein said controller is configured to determine said location information based on a plurality of signal characteristics of communications between the portable device and said antenna of said object device.

13. The system of claim 12 wherein each of said plurality of signal characteristics is obtained by said object device, and wherein said plurality of signal characteristics are different from each other.

* * * * *